US008237733B2

(12) United States Patent
Rhodes

(10) Patent No.: US 8,237,733 B2
(45) Date of Patent: Aug. 7, 2012

(54) PAGE TRANSITION ON ELECTRONIC PAPER DISPLAY

(75) Inventor: Bradley J. Rhodes, Alameda, CA (US)

(73) Assignee: Ricoh Co., Ltd., Tokyo (JP)

( * ) Notice: Subject to any disclaimer, the term of this patent is extended or adjusted under 35 U.S.C. 154(b) by 675 days.

(21) Appl. No.: 12/415,609

(22) Filed: Mar. 31, 2009

(65) Prior Publication Data

US 2010/0245375 A1 Sep. 30, 2010

(51) Int. Cl.
*G09G 5/02* (2006.01)
*G09G 3/34* (2006.01)
*G09G 5/36* (2006.01)
*G06F 15/00* (2006.01)

(52) U.S. Cl. ......... 345/589; 345/107; 345/545; 345/501

(58) Field of Classification Search ................... 345/589
See application file for complete search history.

(56) References Cited

U.S. PATENT DOCUMENTS

| | | | | |
|---|---|---|---|---|
| 6,067,185 | A | 5/2000 | Albert et al. | |
| 6,147,671 | A | 11/2000 | Agarwal | |
| 6,327,017 | B2 | 12/2001 | Barberi et al. | |
| 6,504,524 | B1 | 1/2003 | Gates et al. | |
| 6,943,773 | B2 * | 9/2005 | Wong et al. | 345/156 |
| 7,012,600 | B2 * | 3/2006 | Zehner et al. | 345/214 |
| 7,119,772 | B2 | 10/2006 | Amundson et al. | |
| 7,528,882 | B2 | 5/2009 | Saori et al. | |
| 2004/0165115 | A9 | 8/2004 | Daly | |
| 2005/0280626 | A1 | 12/2005 | Amundson et al. | |
| 2006/0066503 | A1 | 3/2006 | Sampsell et al. | |
| 2006/0066595 | A1 | 3/2006 | Sampsell et al. | |
| 2006/0164405 | A1 | 7/2006 | Zhou | |
| 2006/0291032 | A1 * | 12/2006 | Zhou et al. | 359/296 |
| 2007/0052667 | A1 | 3/2007 | Zhou et al. | |
| 2007/0057906 | A1 | 3/2007 | Johnson et al. | |
| 2007/0085819 | A1 | 4/2007 | Zhou et al. | |
| 2007/0205978 | A1 * | 9/2007 | Zhou et al. | 345/107 |
| 2008/0291129 | A1 | 11/2008 | Harris et al. | |
| 2008/0309636 | A1 * | 12/2008 | Feng et al. | 345/173 |
| 2008/0309674 | A1 * | 12/2008 | Barrus et al. | 345/545 |
| 2009/0256799 | A1 * | 10/2009 | Ohkami et al. | 345/107 |
| 2009/0256868 | A1 * | 10/2009 | Low et al. | 345/691 |
| 2011/0080418 | A1 * | 4/2011 | Rhodes | 345/522 |

FOREIGN PATENT DOCUMENTS

| | | | |
|---|---|---|---|
| JP | 02-136915 | A | 5/1990 |
| JP | 2003-256134 | A | 9/2003 |
| JP | 2006-243364 | A | 9/2006 |

(Continued)

OTHER PUBLICATIONS

Bresenham, J.E., *Algorithm for Computer Control of a Digital Plotter*, IBM Systems Journal, 1965, pp. 25-30, vol. 4, No. 1.

(Continued)

*Primary Examiner* — Kee M Tung
*Assistant Examiner* — Zhengxi Liu
(74) *Attorney, Agent, or Firm* — Patent Law Works LLP

(57) ABSTRACT

A page transition file creation system and a method for creating a page transition file in a file format suitable for displaying transitions quickly on an electronic paper display. The page transition file creation system creates a page transition file with page transition blocks representing transition between two or more pages. A page transition display system and uses page transition files to display page transitions. The page transition display system determines the appropriate page transition file and waveform lookup table for displaying page transition. The page transition display system uses the determined page transition file and waveform lookup table for displaying the transition.

20 Claims, 19 Drawing Sheets

FOREIGN PATENT DOCUMENTS

| | | | |
|---|---|---|---|
| JP | 2007-102042 | A | 4/2007 |
| JP | 2007-241405 | A | 9/2007 |
| WO | WO 03/044765 | A2 | 5/2003 |
| WO | WO 2004/034366 | A1 | 4/2004 |
| WO | WO 2005/027087 | A1 | 3/2005 |
| WO | WO 2005/078692 | A1 | 8/2005 |
| WO | WO 2005/086131 | A1 | 9/2005 |
| WO | WO 2005/093705 | A1 | 10/2005 |
| WO | WO 2005/096259 | A1 | 10/2005 |
| WO | WO 2005/101362 | A1 | 10/2005 |
| WO | WO 2006/013502 | A1 | 2/2006 |
| WO | WO 2007/099829 | A1 | 9/2007 |

OTHER PUBLICATIONS

Crowley, J.M. et al., *Dipole Moments of Gyricon Balls*, Electrostatics Fundamentals. Applications and Hazards, Selected Papers from the Fourth IEJ-ESA Joint Symposium on Electrostatics, Sep. 25-26, 2000, pp. 247-259, vol. 55, No. 3-4.

PCT International Search Report and Written Opinion, PCT/JP2008/061277, Aug. 19, 2008, 11 pages.

PCT International Search Report and Written Opinion, PCT/JP2008/061273, Sep. 16, 2008, 11 pages.

PCT International Search Report and Written Opinion, PCT/JP2008/061272, Sep. 30, 2008, 10 pages.

PCT International Search Report and Written Opinion, PCT/JP2008/061271, Sep. 30, 2008, 11 pages.

PCT International Search Report and Written Opinion, PCT/JP2008/061278, Oct. 7, 2008, 11 pages.

Zehner, R. et al., *Drive Waveforms for Active Matrix Electrophoretic Displays*, May 2003, pp. 842-845, vol. XXXIV, Book II.

* cited by examiner

400

506

508

552

554

600

PAGE TRANSITION ON ELECTRONIC PAPER DISPLAY

BACKGROUND OF THE INVENTION

1. Field of Art

The disclosure generally relates to the field of electronic paper displays. More particularly, the invention relates to systems and methods for displaying a page transition on electronic paper displays.

2. Description of the Related Art

Several technologies have been introduced recently that provide some of the properties of paper in a display that can be updated electronically. Some of the desirable properties of paper that this type of display tries to achieve include: low power consumption, flexibility, wide viewing angle, low cost, light weight, high resolution, high contrast and readability indoors and outdoors. Because these types of displays attempt to mimic the characteristics of paper, they are referred to as electronic paper displays (EPDs) in this application. Other names for this type of display include: paper-like displays, zero power displays, e-paper and bi-stable displays.

A comparison of EPDs to Cathode Ray Tube (CRT) displays or Liquid Crystal Displays (LCDs) reveal that in general, EPDs require less power and have higher spatial resolution; but have the disadvantages of slower update rates, less accurate color control, and lower color resolution. Many electronic paper displays were previously only grayscale devices. Color EPDs are becoming available although often through the addition of a color filter, which tends to reduce the spatial resolution and the contrast.

The key feature that distinguishes EPDs from LCDs or CRTs is that EPDs can maintain an image without using power. They are sometimes referred to as “bi-stable” because black or white pixels can be displayed continuously and power is only needed to change from one state to another. However, some devices are stable at multiple states and thus support multiple colors without power consumption. EPDs are also typically reflective rather than transmissive. Thus they are able to use ambient light rather than requiring a lighting source in the device. Various technologies have been developed to produce EPDs. Depending on the technology used, such displays are sometimes called electrophoretic displays, electro-wetting displays, cholesteric LCD (Ch-LC). Techniques have also been developed to produce EPDs by embedding organic transistors into flexible substrates.

The luminance or color of a pixel in a traditional LCD display depends on the voltage currently being applied at the given point, with a given voltage reliably corresponding to a specific luminance. The luminance or color of a pixel in a bistable display, on the other hand, typically changes as voltage is applied. For example, in some bistable displays applying a negative voltage to a pixel makes it lighter (higher luminance) and a positive voltage makes it darker. The higher the voltage and the longer or more times that voltage is applied, the larger the change in luminance. This has two implications for driving such displays. First, electronic paper displays are typically controlled by applying a sequence of voltages to a pixel instead of just a single value like a typical LCD. These sequences of voltages are sometimes called waveforms. The second implication is that the control signals used to drive a pixel depend not only on the optical state the pixel is being driven to, but also on the optical state it is being driven from. Depending on the display technology, other factors may also need to be taken into consideration when choosing the waveform to drive a pixel to a desired color. Such factors can include the temperature of the display, optical state of the pixel prior to the current optical state, and dwell time (i.e. the time since the pixel was last driven). Failure to take these factors into account can lead to faint remnants of images that have supposedly been erased still being visible, a visual artifact known as ghosting. Some displays also have additional requirements that must be met to avoid damaging the display, such as the requirement that waveforms be DC balanced.

To handle these issues, some controllers for driving the displays are configured like an indexed color-mapped display. The framebuffer of these electronic paper displays includes an index to the waveform used to update that pixel instead of the waveform itself. Whenever the optical state of a pixel is to be changed, the index of the appropriate waveform is chosen based on at least some of the factors listed above, and the pixel's location in the frame buffer is set to that index. Some displays will encode some factors (such as a pixel's current and desired optical state) in the waveform index and then choose which waveform table to use when updating a set of pixels based on other factors (such as temperature).

One problem with the above technique is that it typically takes longer to compute which waveform to apply to a pixel than it does to perform the corresponding operation on a conventional CRT or LCD display. This can lead to a considerable latency between when an application requests a new image be displayed and when the image actually appears. For example, an EPD using a prior art controller can take on the order of half a second to calculate new pixel values for a 1200×825 display. The latency can be improved with faster or additional hardware, but only with increased cost and power consumption. To some extent the latency can also be reduced by simplifying the calculation, for example by ignoring secondary factors such as dwell time and pixel history (prior displayed colors for the pixel) prior to the current optical state, but this can result in increased ghosting.

While current update times are generally sufficient for the page turning needed by electronic books, they are problematic for interactive applications that emulate page transitions or page flipping at higher speeds. A user may tolerate waiting for a second or two for transitioning between two pages when the user spends a few minutes reading each page. However, when the user wants to flip through numerous pages successively without spending more than a few seconds on each page such as to find a section, illustration or particular part of a larger document, the transition time of half a second between pages becomes unacceptable.

SUMMARY OF THE INVENTION

The present invention includes a page transition file creation system and a method for creating a page transition file for displaying transitions quickly on an electronic paper display. The present invention also includes a page transition display system and a method for displaying page transitions using page transition files.

The page transition file creation system comprises an image buffer feeding module and a page transition block determination module. The image buffer feeding module receives an input document, extracts image blocks representing document pages from the input document, and delivers the image blocks to page transition block determination module. The page transition block determination module converts the received input image blocks into a page transition file and stores the page transition file for later use.

A page transition file comprises a header and a plurality of page transition blocks. The header of the page transition file comprises components such as H, CBITS, N and Num_Pix and value for these components. H is the number of document pages represented in each page transition block. CBITS is the number of bits used to represent color of a pixel for a particular page in the page transition file. N is the number of pages in the input document, and Num_Pix is the number of pixels in each page of the document. A page transition block represents a transition through H−2 previous pages, current page, and next page. A page transition block comprises Num_Pix transition pixels, each transition pixel representing varying colors of an image pixel on H consecutive pages of the document.

The page transition file creation system creates one or more page transition files corresponding to an input document for later displaying page transitions in different directions. The plurality of page transition files also have different H and CBITS values.

The page transition display system receives the page transition file and uses the information in page transition file to display page transitions on physical media. The page transition display system comprises a page transition block feeding module, a waveform lookup table selection module and a display controller.

The page transition block feeding module determines the appropriate page transition file comprising the page transition blocks and transmits the determined page transition blocks to display controller. In one embodiment, the page transition block feeding module determines the H and CBITS supported by the display controller and the page transition block feeding module determines the page transition file that supports the corresponding H and CBITS. In another embodiment, the page transition block feeding module receives from an end user application page transition direction and/or H. The page transition block feeding module selects a page transition file corresponding to the received variable or variables and transmits the appropriate page transition block from the selected file to display controller.

The waveform lookup table selection module determines and transmits to display controller waveform lookup tables corresponding to the transmitted page transition blocks, page transition speed and page transition direction. The waveform lookup table comprises waveforms for transitioning a pixel color on physical media from one color to another.

In one embodiment, the waveform lookup table selection module receives from an end user application the page transition speed, page transition direction, and H. The waveform lookup table selection module selects a corresponding waveform lookup table based on one or more of the received variables. In another embodiment, the waveform lookup table receives from page transition block feeding module information about the selected page transition file and the waveform lookup table selection module selects a corresponding waveform lookup table. The waveform lookup table selection module transmits the selected waveform lookup table to display controller.

The display controller uses the received page transition blocks and waveform lookup table to determine waveforms, applies the determined waveform to physical media, and drives the pixel colors on physical media to desired colors.

BRIEF DESCRIPTION OF THE DRAWINGS

The disclosed embodiments have other advantages and features which will be more readily apparent from the detailed description, the appended claims, and the accompanying figures (or drawings).

Figure 1:
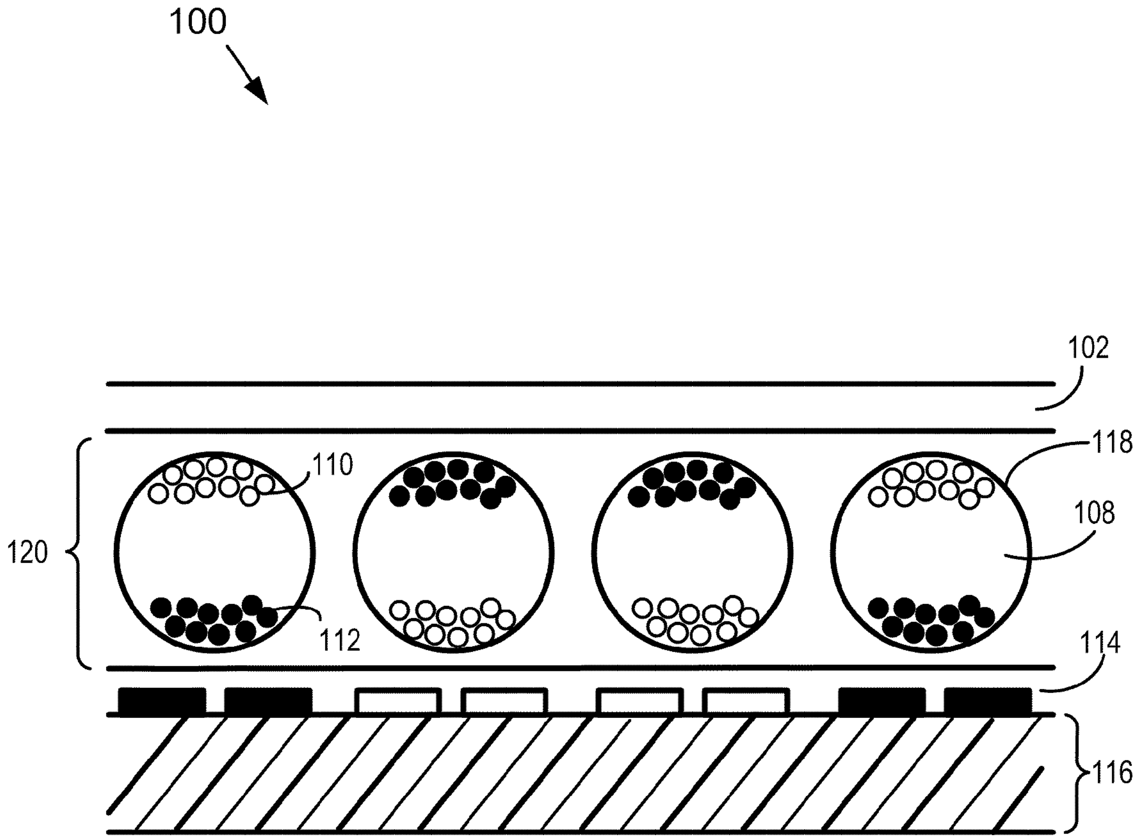
FIG. 1 illustrates a cross-sectional view of a portion of an exemplary electronic paper display.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A system and method for displaying page transitions on electronic paper display are described. The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein any reference to "one embodiment," "an embodiment," or "some embodiments" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Also, some embodiments of the invention may be further divided into logical modules. One of ordinary skill in the art will understand that these modules can be implemented in hardware, firmware, and/or software. In one embodiment, the modules are implemented in form of computer instructions stored in a computer readable medium when executed by a processor cause the processor to implement the functionality of the module. Additionally, one of ordinary skill in the art will recognize that a computer or another machine with instructions to implement the functionality of one or more logical modules is not a general purpose computer. Instead, the machine is adapted to implement the functionality of a particular module. Moreover, the machine embodiment of the invention physically transforms the electrons representing the images in the document from one state to another in order to attain the desired format.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Device Overview

FIG. 1 illustrates a cross-sectional view of a portion of an exemplary electronic paper display 100. The components of the electronic paper display 100 are sandwiched between a top transparent electrode 102 and a bottom backplane 116. The top transparent electrode 102 is a thin layer of transparent material. The top transparent electrode 102 allows for viewing of microcapsules 118 of the electronic paper display 100.

Directly beneath the top transparent electrode 102 is the microcapsule layer 120. In one embodiment, the microcapsule layer 120 includes closely packed microcapsules 118 having a clear fluid 108 and some black particles 112 and white particles 110. In some embodiments, the microcapsule 118 includes positively charged white particles 110 and negatively charged black particles 112. In other embodiments, the microcapsule 118 includes positively charged black particles 112 and negatively charged white particles 110. In yet other embodiments, the microcapsule 118 include colored particles of one polarity and different colored particles of the opposite polarity. In some embodiments, the top transparent electrode 102 includes a transparent conductive material such as indium tin oxide.

Disposed below the microcapsule layer 120 is a lower electrode layer 114. The lower electrode layer 114 is a network of electrodes used to drive the microcapsules 118 to a next optical state. The network of electrodes is connected to display circuitry, which turns the electronic paper display "on" and "off" at specific pixels by applying a voltage to specific electrodes. Applying a negative charge to the electrode repels the negatively charged particles 112 to the top of microcapsule 118, forcing the positively charged white particles 110 to the bottom and giving the pixel a black appearance. Reversing the voltage has the opposite effect—the positively charged white particles 112 are forced to the surface, giving the pixel a white appearance. The luminance of a pixel in an EPD changes as voltage is applied. The amount the pixel's luminance changes may depend on both the amount of voltage and the length of time for which it is applied, with zero voltage leaving the pixel's luminance unchanged.

The electrophoretic microcapsules of the layer 120 may be individually or collectively activated to a next optical state, such as black, white or gray. In some embodiments, the next optical state may be any other prescribed color. Each pixel in layer 114 may be associated with one or more microcapsules 118 contained within a microcapsule layer 120. Each microcapsule 118 includes a plurality of tiny particles 110 and 112 that are suspended in a clear fluid 108. In some embodiments, the plurality of tiny particles 110 and 112 are suspended in a clear liquid polymer.

The lower electrode layer 114 is disposed on top of a backplane 116. In one embodiment, the electrode layer 114 is integral with the backplane layer 116. The backplane 116 is a plastic or ceramic backing layer. In other embodiments, the backplane 116 is a metal or glass backing layer. The electrode layer 114 includes an array of addressable pixel electrodes and supporting electronics.

Figure 2A:
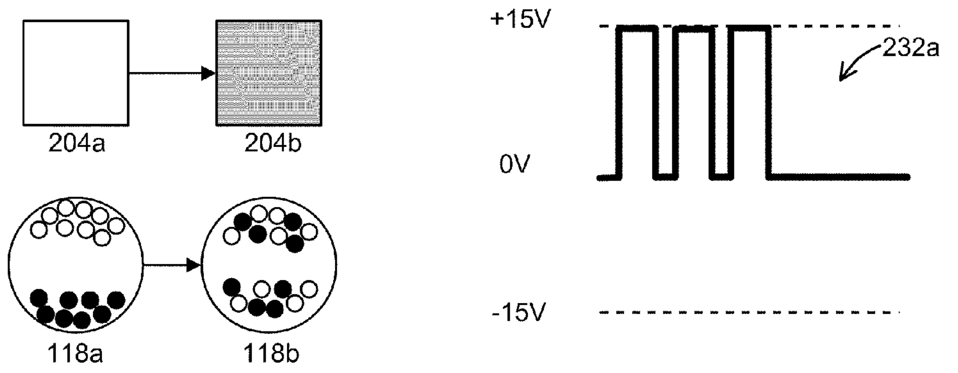
FIG. 2A-2C illustrates the movement of white particles and black particles in a microcapsule of electronic paper display in response to applied waveform leading to change in color of a corresponding pixel.
Figure 2B:
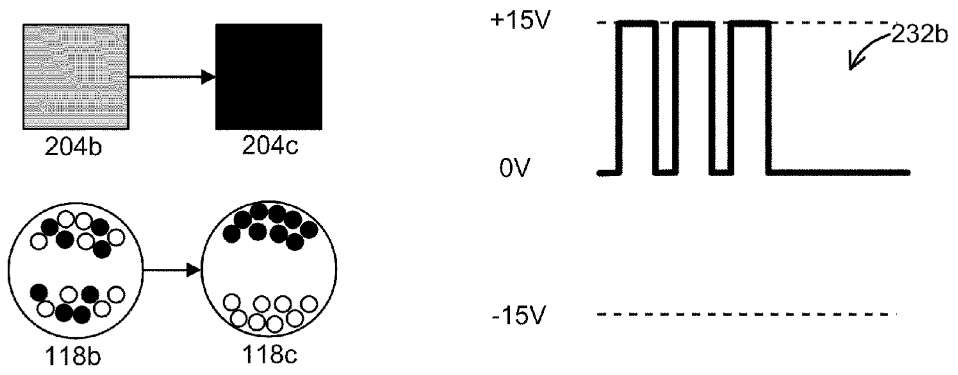
Figure 2C:
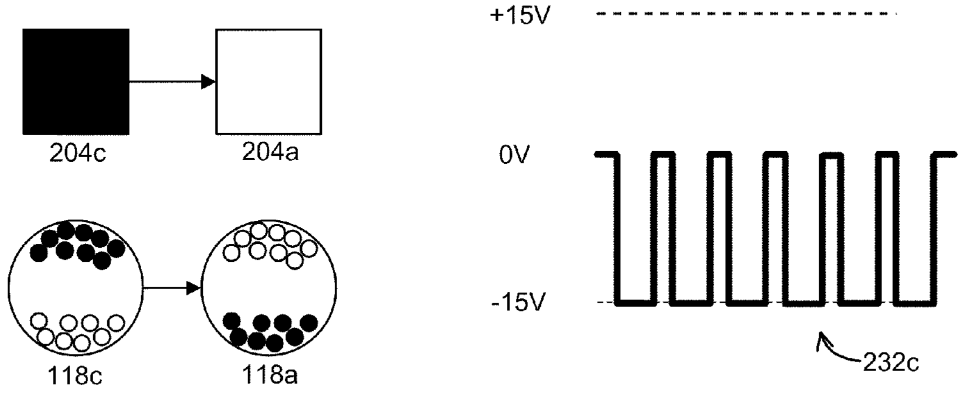

FIGS. 2A-2C illustrate the movement of white particles 110 and black particles 112 in microcapsule 118 of electronic paper display in response to the applied waveform leading to changes in color of a corresponding pixel. For clarity and ease of understanding, FIGS. 2A-2C do not display every physical layer of electronic paper display 100. FIGS. 2A-2C instead display examples of waveforms 232*a-c* that can be applied by electrode layer 114 to one or more microcapsules 118 and the resulting change in pixel color 204*a-c*.

FIG. 2A illustrates a change in position of white particles 110 and black particles 112 in microcapsule 118 when electrode layer 114 applies a waveform 232*a* including three frames of +15V. The application of such a waveform 232*a* leads to some of the positively charged black particles 112 to move away from the electrode layer 114 and closer to top transparent electrode 102. For similar reason, some of the negatively charged white particles 110 move towards the positively charged electrode layer 114 and away from the top transparent electrode 102. This movement of black and white particles 112, 110 leads to a mixture of black and white particles 112, 110 visible through the top transparent electrode 102. The visible mixture appears as a gray color 204*b* for a corresponding pixel. As discussed above, microcapsule 118 maintains this state or this gray color 204*b* until another waveform is applied to the microcapsule 118.

FIG. 2B illustrates electrode layer 114 applying another waveform 232*b* to microcapsule 118 after the microcapsule 118 has reached the gray color 204*b*. In this illustration, application of an additional waveform 232*b* including three frames of +15V to microcapsule 118 leads to the remaining negatively charged white particles to move towards the electrode layer 114 and the remaining positively charged black particles to move towards the transparent electrode 102. As a result, all the positively charged black particles are visible through the transparent electrode 102 and the pixel color changes from gray 204*b* to black 204*c*.

FIG. 2C illustrates an application of waveform 232*c* including six −15V frames to move all the positively charged black particles 112 close to electrode layer 114 and negatively charged white particles 110 close to transparent electrode 102. As a result, the visible color of the corresponding pixel changes from black 204*c* to white 204*a*.

As apparent from FIG. 2A-2C, six +15V frames change the pixel color from white 204*a* to black 204*c* and six −15V frames change the pixel color from black 204*c* to white 204*a*. In some embodiments, the waveform required to change the color from a first color to a second color may not be exact polar opposite of the waveform required to change the color from the second color back to the first color. In addition, waveforms may contain a mix of positive, negative, or zero voltages.

Additionally, the waveform frames can each represent a time period like 20 milliseconds (ms) in one embodiment. Accordingly, the time required to change the pixel color from white 204*a* to black 204*c* is six frames or 120 ms. This time is usually acceptable to a reader watching the transition of pixels as the user flips through pages on an electronic paper display. However, it typically takes longer to compute which voltage or waveform to apply to a pixel than it does to perform the corresponding operation on an EPD. This lag can create a delay between transitions which is unacceptable to a reader and can be reduced by using an efficient file format explained below.

File Format with Page Transition Blocks and Waveform Lookup Table

Figure 3:
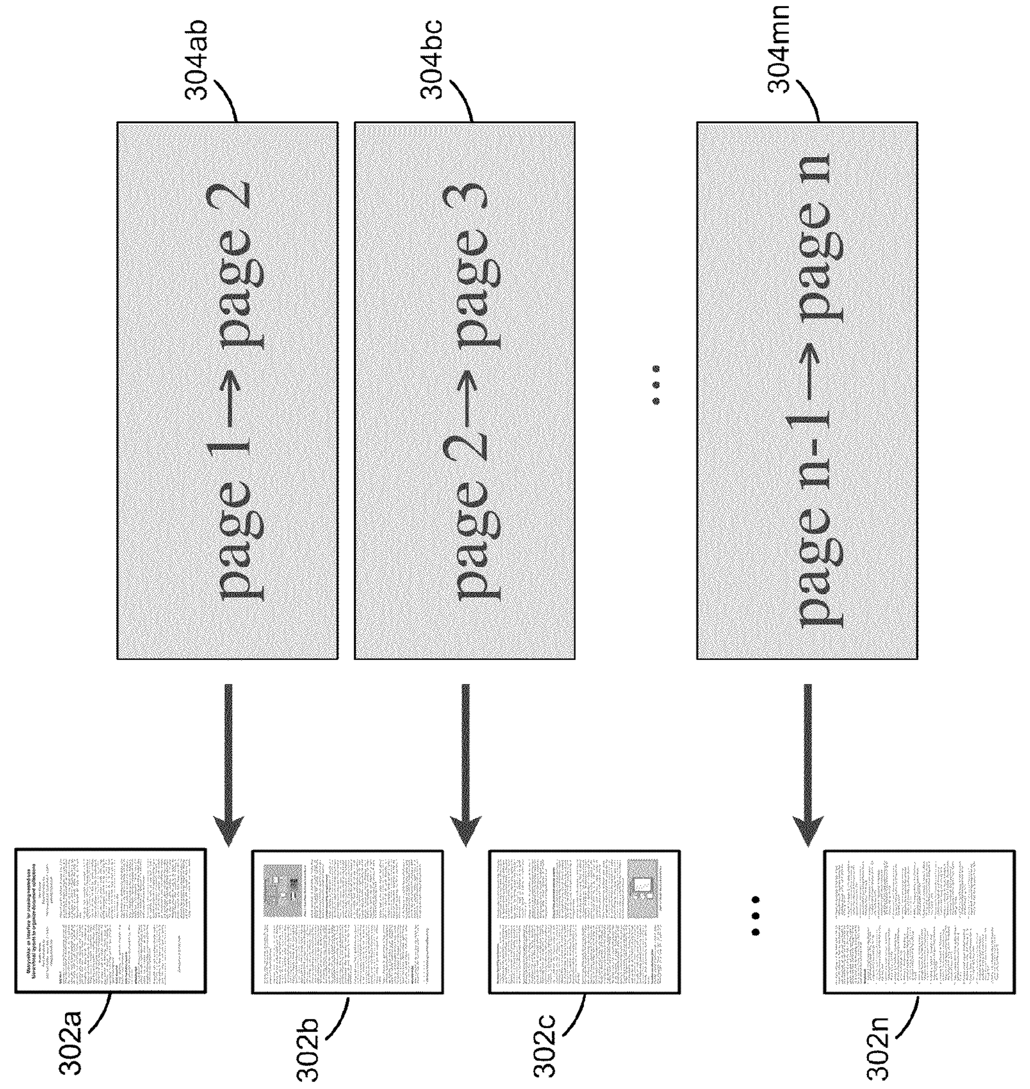
FIG. 3 illustrates a visual representation of page transition blocks according to some embodiments of the invention.

FIG. 3 illustrates a visual representation of page transition blocks according to some embodiments of the invention. Pages 302*a-n* represent n pages in a document. Page 304*ab* represents a transition page between page 302*a* and page 302*b*. Page 304*bc* represents the transition page between page 302*b* and page 302*c*. Similarly, page 304 nm represents the transition page between page 302*m* (not shown) and page 302*n*. In one embodiment, a page transition block 404 (see FIGS. 4A-4D) represents transition of more than one page to another. For example, a page transition block 404 can represent a transition from page 1 to page 2 and transition from page 2 to page 3.

Figure 4A:
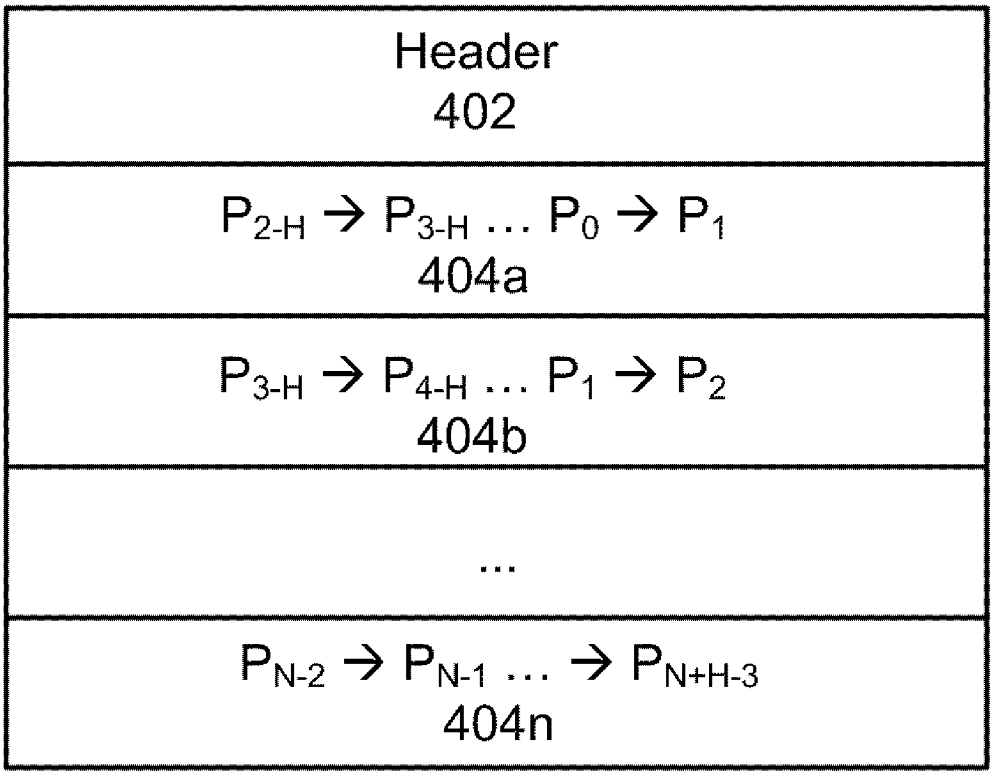
FIG. 4A illustrates a page transition file in a format that includes a sequence of page transition blocks, with each block representing transitions through previous pages, current page, and next page according to some embodiments of the invention.

FIG. 4A illustrates a page transition file 400 in a format that includes a header 403 and a sequence of page transition blocks 404*a-n* (referred to as page transition blocks 404 collectively), with each block 404*a-n* representing transitions through H−2 previous pages, current page, and next page. H is the number of pages represented in each page transition block.

Header 402 comprises components such as H, CBITS, N and Num_Pix and values for these components. CBITS is the number of bits used to represent color of a pixel from a single page within a transition pixel. N is the number of pages in the document represented by page transition file 400. Num_Pix is the number of pixels in each page of the document. In one embodiment, header 402 also comprises one or more of page transition speed and page transition direction supported by the page transition file 400.

Page Transition block 404 represents a transition of H document pages. Pi represents page I in the document, with the first page of the document represented as P0, the second as P1, etc. The page transition block 404 comprises Num_Pix transition pixels, each transition pixel represented by H*CBITS bits wherein H groups of CBITS bits represent the varying colors of a pixel in H different document pages. These transition pixels are used by the display controller 712 (See FIG. 7) to determine a corresponding waveform to drive the color of the corresponding pixel on physical media 120 to a desired color. In one embodiment, the transition pixel values are indices to the corresponding waveforms in the waveform lookup table 500 (See FIG. 5) and the display controller 712 uses these transition pixels to retrieve the corresponding waveform from waveform lookup table 500.

Figure 4B:
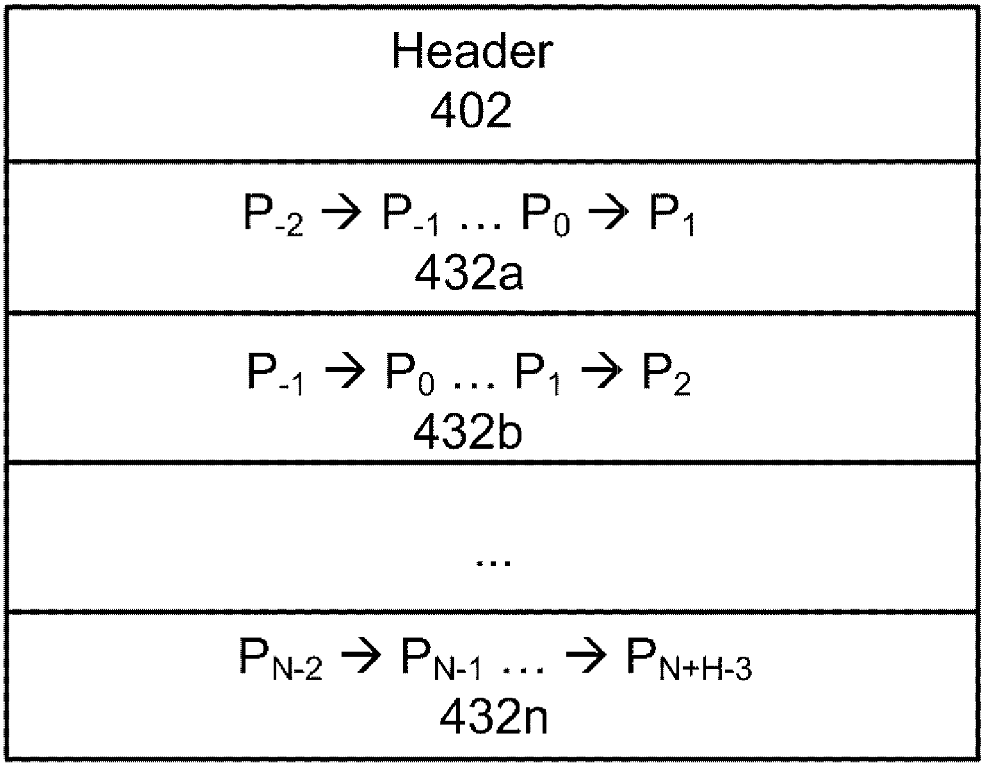
FIG. 4B illustrates a page transition file that accounts for two previous pages, a current page and a next page in transitioning from current page to next page according to some embodiments of the invention.

In one embodiment, the first few and last few page transition blocks are padded with dummy pages comprising of white pixels or some other solid color or neutral pattern pixels. The dummy pages are space filers in a page transition block 404 used when a previous page or a next page does not exist in the document but is used in page transition blocks 404 to adhere to the page transition file format. For example, FIG. 4B illustrates a page transition file in format of FIG. 4A with H=4. In this example, the first page transition block 432*a* represents Page 0 (the first page in the document and the current page), Page 1 (the next page) and two previous pages, Page −2 and Page −1. Because Page −2 and Page −1 do not exist in the document, the page transition file creation system 600 (See FIG. 6) adds dummy pages in place of the non-existing previous pages.

Figure 4C:
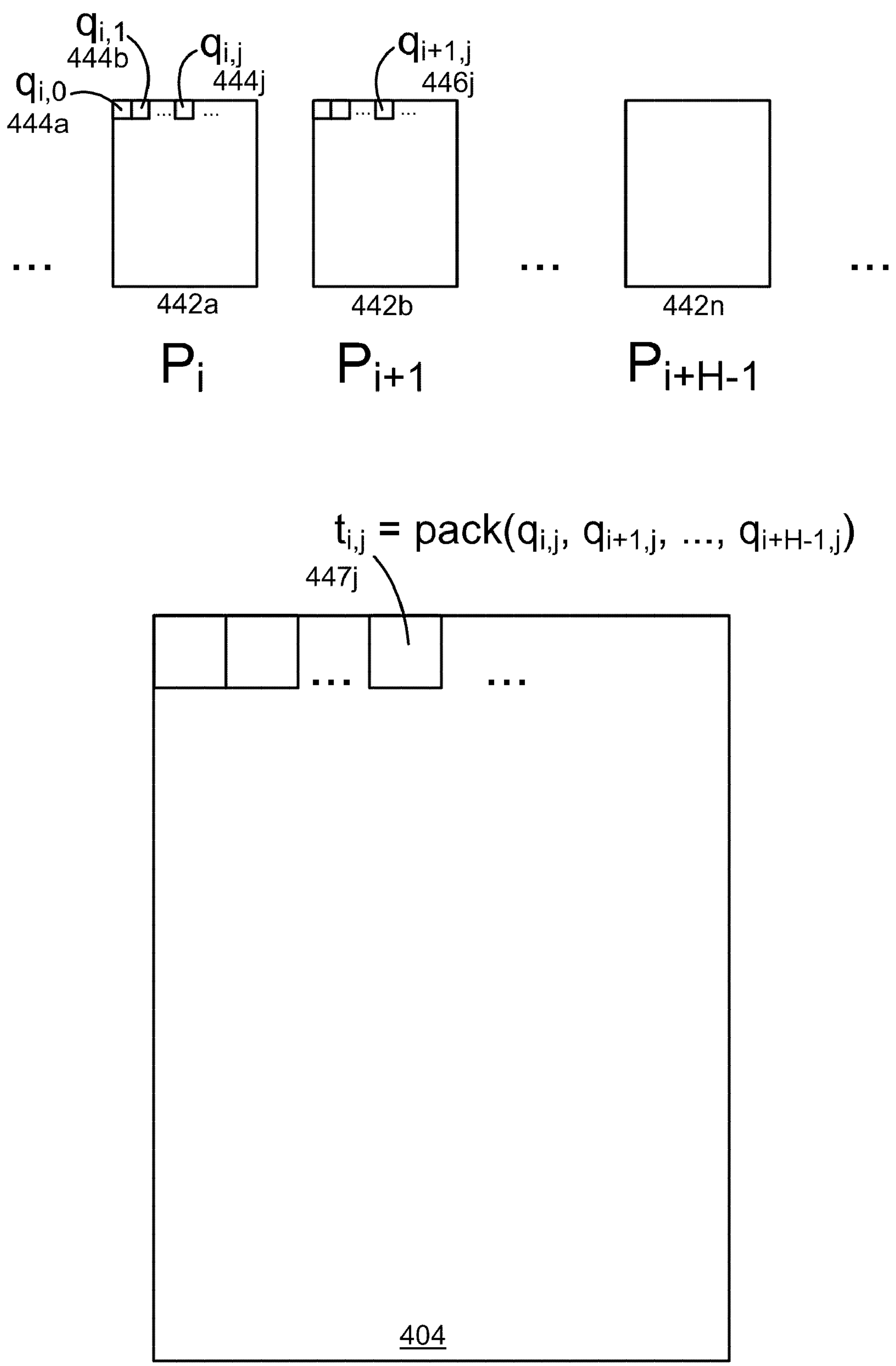
FIG. 4C illustrates a page transition block in page transition file according to some embodiments of the invention.

FIG. 4C illustrates a page transition block 404 in page transition file 400. As described above, a page transition block 404 represents a transition of H document pages. In FIG. 4C, the H document pages are pages $P_i$ 442*a* to $P_{i+H-1}$ 442*n*. Each document page 442 has Num_Pix pixels $q_{i,j}$ where $q_{i,j}$ represents the color of pixel j on page $P_i$. The page transition block 404 comprises Num_Pix transition pixels $t_{i,j}$ where $t_{i,j}$ is transition pixel j on page transition block i. Each transition pixel represents a pixel's color transition on H different pages. For example, transition pixel $t_{i,j}$ represents color transition of pixel j from page $P_i$ to page $P_{i+H-1}$. The transition pixel $t_{i,j}$ therefore represent the color of pixel $q_{i,j}$ to pixel $q_{i+H-1,j}$. In one embodiment, the color of pixel $q_i$ to $q_{i+H-1}$ is represented by CBITS pixels each and the transition pixel includes CBITS bits for each of these pixel colors. The transition pixel is therefore CBITS times H bits long.

Figure 4D:
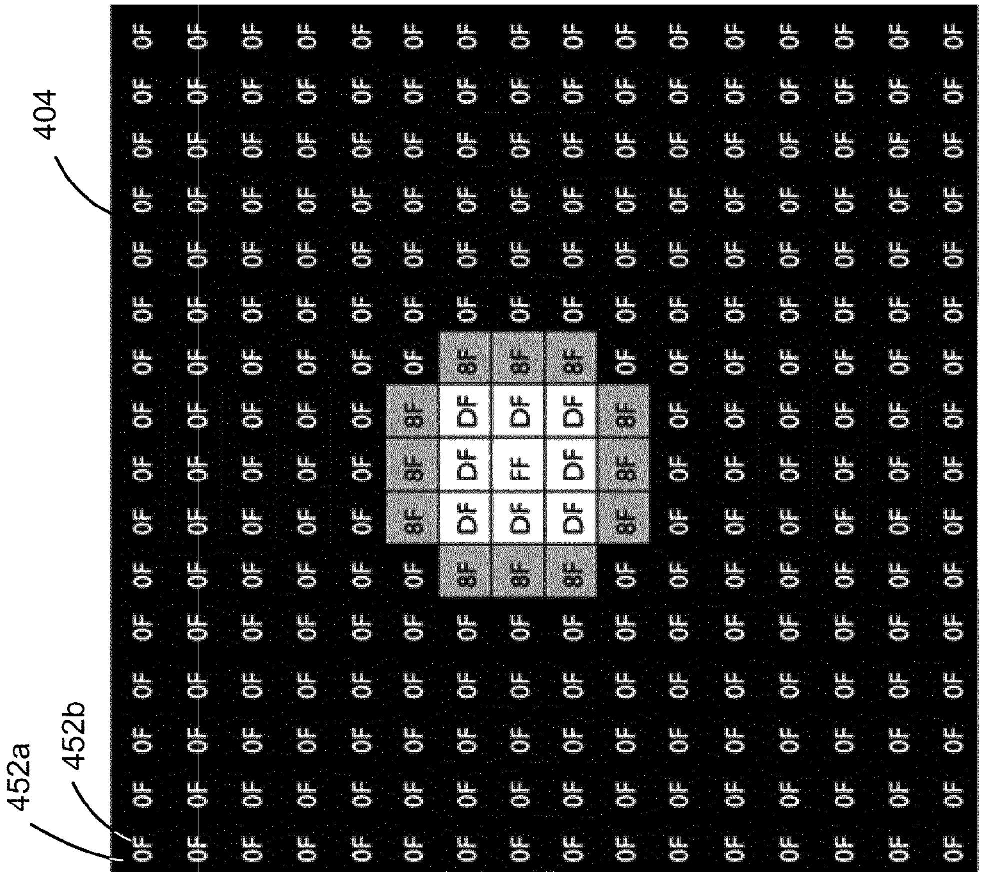
FIG. 4D illustrates a page transition block that accounts for current page and next page in transitioning from current page to next page according to some embodiments of the invention.

FIG. 4D illustrates a page transition block 404 where H is equal to 2 and CBITS is 4. In this illustration of page transition block 404, a nibble (i.e. 4 bits) 452*a* and 452*b* together represent a transition pixel in page transition block 404. Nibble 452*a* represents a current color of a pixel in the current page and 452*b* represents a next color of pixel in the next page. For clarity, each transition pixel is colored with the color of the corresponding pixel in the current page image (a black field with a lightening center region). The next page image (not shown) is an all-white field.

The current value 452*a* and next value 452*b* together represent a change in the color of a pixel from a current value to a next value. In one embodiment, this change in color is represented by a single delta value that comprises the difference between the previous color value and next color value. One of ordinary skill in the art will understand that there are multiple ways of representing the difference in current color and next color.

A page transition file creation system 600 creates files in the page transition file format described in FIG. 4A-4D. The page transition file creation system 600 and the method for creating a page transition file are discussed below in FIGS. 6, 8 and 9. The display controller 712 receives page transition blocks 404 from the page transition file 400 and a corresponding waveform lookup table 500. The display controller 712 then uses the page transition block 404 and waveform lookup table 500 to drive the color of a pixel on physical media 120. The display controller 712 and the method for using the page transition file 400 to drive a pixel color on physical media 120 are described in FIGS. 7, 10, and 11 below. The waveform lookup tables 500 are described in the following section.

Waveform Look-Up Table

Waveform lookup tables 500 comprise waveforms (sequence of voltages applied over time) applied by display controller 712 to drive a pixel on physical media 120 from one color to another. In one embodiment, the waveform lookup table 500 is divided into time periods represented by frames and each frame includes a part of the waveform required to drive the pixel from one color to another. In this embodiment, the waveform lookup table 500 maps a waveform index (represented as a transition pixel) and a frame number to a voltage that should be applied to the pixel represented by a given transition pixel for that frame.

The example below in FIG. 5A-5E illustrates a waveform lookup table 500 that considers one previous color value to drive the pixel to the next color value. In one embodiment, the waveform lookup table 500 comprises waveforms that account for multiple previous values, i.e. H>2, to drive a pixel to next value. For example, a waveform lookup table 500 includes a waveform that changes the pixel color to white after the pixel color has changed from white to black to light gray. FIG. 5F illustrates an example of waveform lookup table where H=3 (i.e. H>2).

The disclosed file format supports different predefined waveform lookup tables for different transition lengths (i.e. number of frames taken by display driver to change the color of a pixel from previous state to next state), direction of page transition, values for H and CBITS for a particular page transition file, and amount of pixel history to take into account when determining a waveform to apply.

Figure 5A:
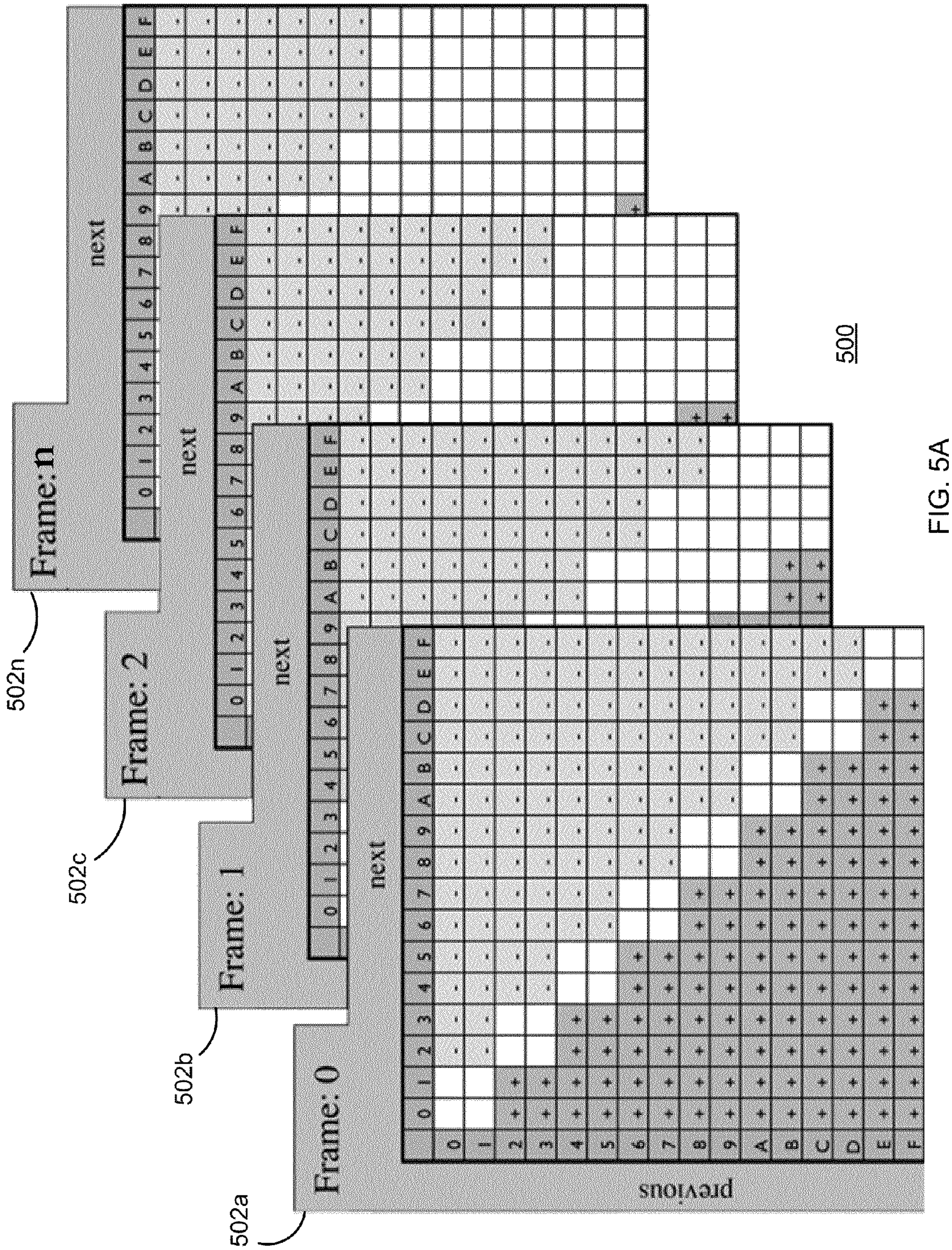
FIG. 5A illustrates a waveform lookup table according to some embodiments of the invention.

FIG. 5A illustrates a waveform lookup table 500 in accordance with some embodiments of the invention. One representation of waveform lookup table 500 comprises of n P×Q frames 502*a* to 502*n* where P and Q are positive integers, with each combination of P and Q making up a single waveform index. Each frame 502*a-n* comprises P rows corresponding to P previous colors and Q columns corresponding to Q next colors. Colors 204*a-c* in FIG. 2A-2C represents three examples of these colors. In one embodiment, as displayed in FIG. 5A, the electronic paper display device supports 16 previous colors that can be transformed to 16 next colors and the waveform lookup table has n 16×16 frames.

The boxes in frames 502*a-n* represent a charge, i.e. a part of the waveform, which needs to be applied to change the pixel from a previous color to a next color. For example, to change a pixel from previous color F to next color A, a positive charge is required in the first frame according to frame 502*a*. Positive voltage (+15V) and Negative voltage (−15V), and zero voltage of waveforms 232*a-c* in FIG. 2A-2C are examples of the charge values present in each box of frames 502*a-n*. In one embodiment, multiple levels of positive and negative voltages may be specified.

Each frame 502*a-n* is used for a time period like 20 milliseconds (ms). In one embodiment, frames 502*a-n* may be used for varying time periods. For example, frame 502*a* can be used for 10 ms and frame 502*b* can be used for 20 ms. The display controller 712 reads a new frame from the lookup table 500 every time period to determine the charge that should be applied to a given pixel to transform the pixel from one level of gray to another level. Accordingly, to change a pixel from previous color F to a next color A, a positive charge of 15 volts is applied for 2 frames (frame 0 502*a* and frame 1 502*b*). The third frame 502*c* displays that no charge is required for frame 2 to change the pixel color to color A. The display controller 712 therefore reads these frames and applies to a pixel on physical media 120 a positive charge of 15 volts for two time periods (one time period each for frame 0 502*a* and frame 1 605*b*) to change previous color F to next color A.

The n number of frames in a waveform lookup table 500 is related to the frame rate of the image group being displayed. For example, an image group with a frame rate of 16.6 frames per second (fps) implies that the transition between one image to another would take approximately 1/16s or 60 ms. Assuming each lookup frame in the lookup table 500 represents 20 ms time period, the lookup table 500 for a 16.6 fps image group would have three frames 502*a-c* with charge values to change a pixel from one color to another.

Figure 5B:
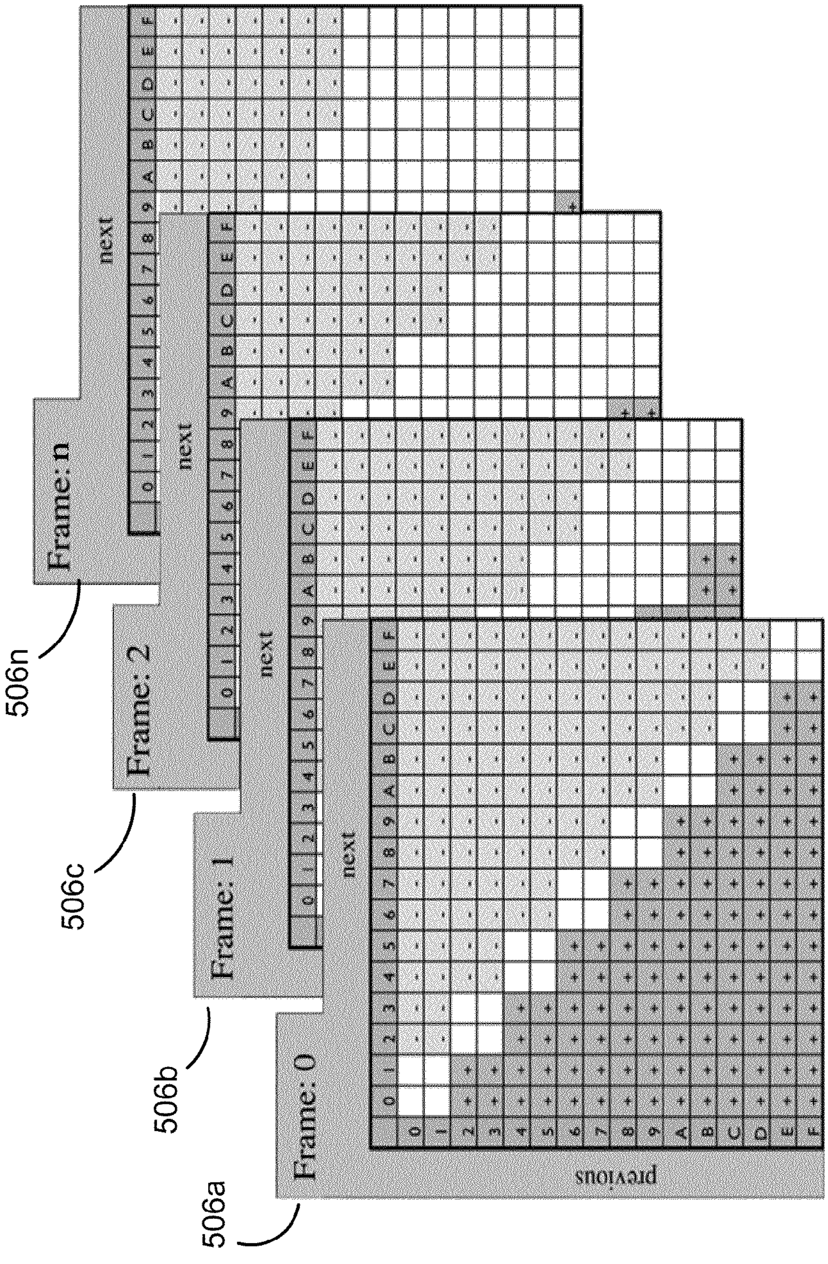
FIG. 5B illustrates a forward lookup table according to some embodiments of the invention.

FIG. 5B illustrates a forward lookup table 506 according to some embodiments of the invention. The forward lookup table 506 enables forward transitions, i.e. transitioning from page 1 to page 2 and so on. Frames 506*a-n* represent a forward lookup table 506, like the one discussed in FIG. 5A, that includes waveforms for transitioning the color of a pixel from one level to another. The display controller determines the appropriate waveform from forward lookup table 506 to transition color of pixels when the user flips pages in forward direction from page 1 to page 2, given the value of the pixel for page 0.

Figure 5C:
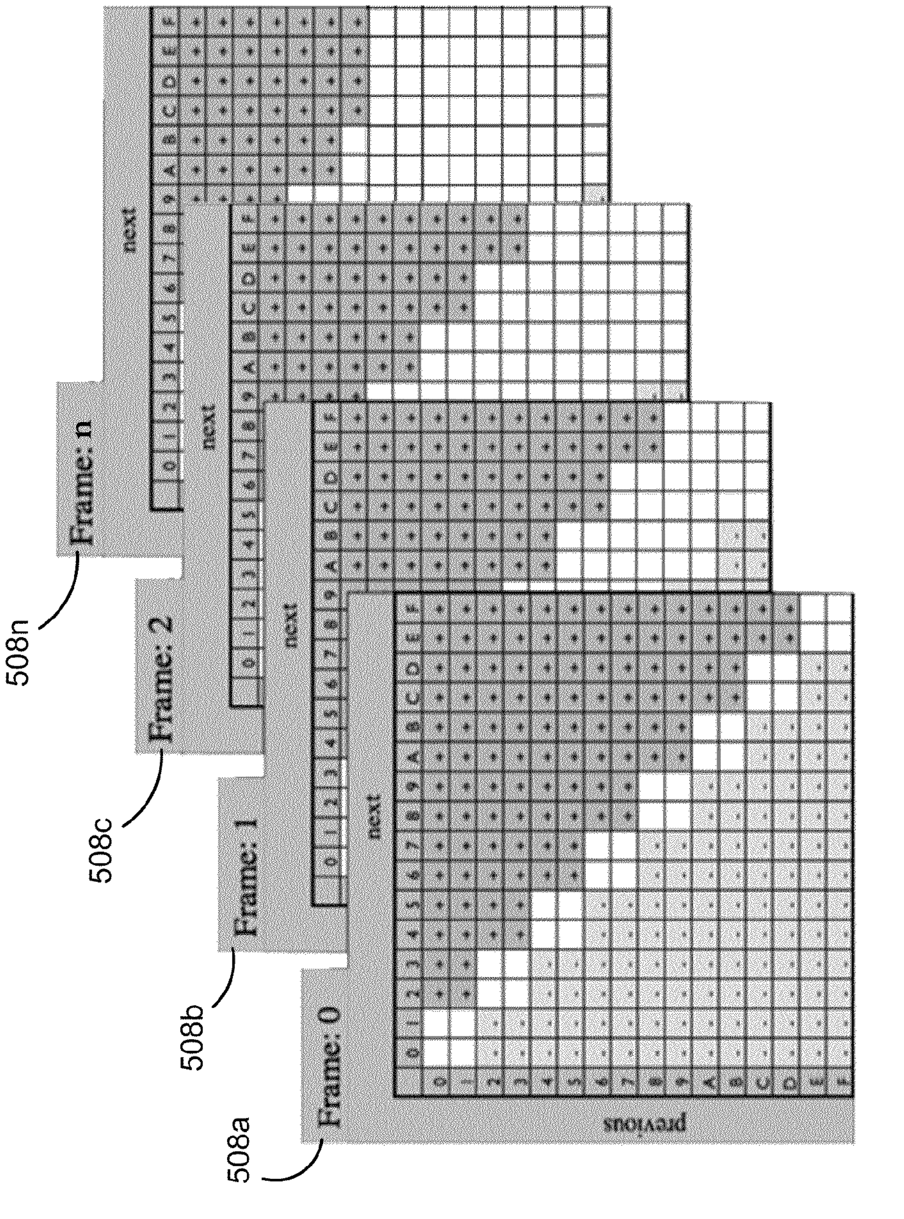
FIG. 5C illustrates a reverse lookup table according to some embodiments of the invention.

FIG. 5C illustrates a reverse lookup table 508 according to some embodiments of the invention. The reverse lookup table 508 enables backwards transitions, i.e. transition from page 2 to page 1 and so on. Frames 508*a-n* represent a reverse look up table 508 that includes waveforms to transition a pixel color from color on page n+1 to color on page n. The display controller 712 uses the values from reverse lookup table 508 when the user flips pages in reverse direction, for example, from page 2 to page 1.

In one embodiment, reverse lookup frames 508*a-n* include the same values as forward look-up frames 506*a-n* but the axes are flipped for frames 508*a-n*. The previous axis of frames 506*a-n* correspond to next axis of frames 508*a-n* and next axis of frames 506*a-n* correspond to the previous axis of frames 508*a-n*. The reverse lookup frames 508*a-n* therefore include voltage values that are axial flips of corresponding voltage values in lookup frames 506*a-n*.

In another embodiment, the reverse lookup frames 508*a-n* include charge values that are polar opposites of the corresponding charge values in lookup frames 506*a-n*. For example, if 508*a* has a +15V value in row A column F, frame 506*a* will have a −15V value in row A column F.

Figure 5D:
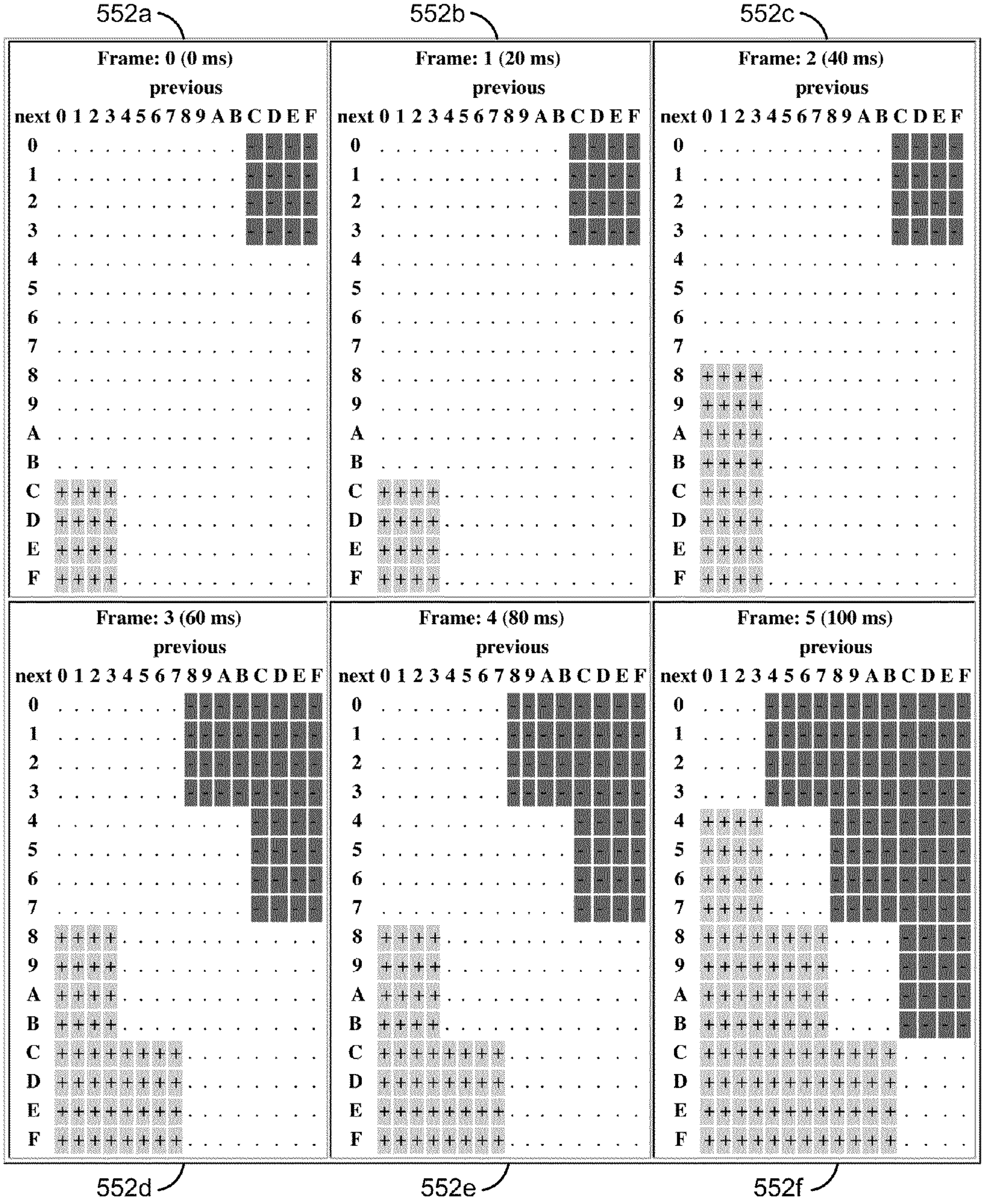
FIGS. 5D and 5E illustrate the relationship between a forward lookup table and a reverse lookup table according to some embodiments of the invention.
Figure 5E:
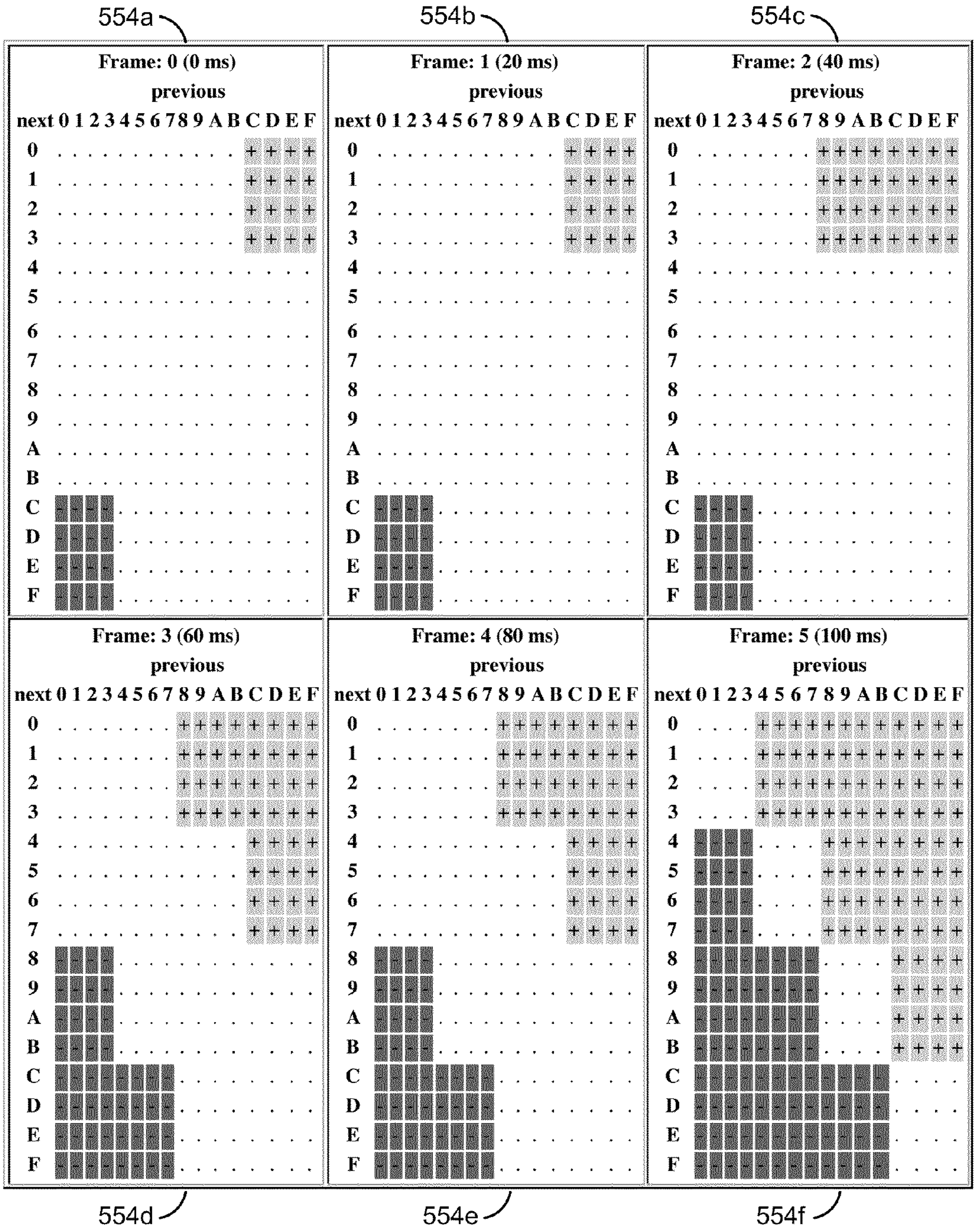
Figure 5F:
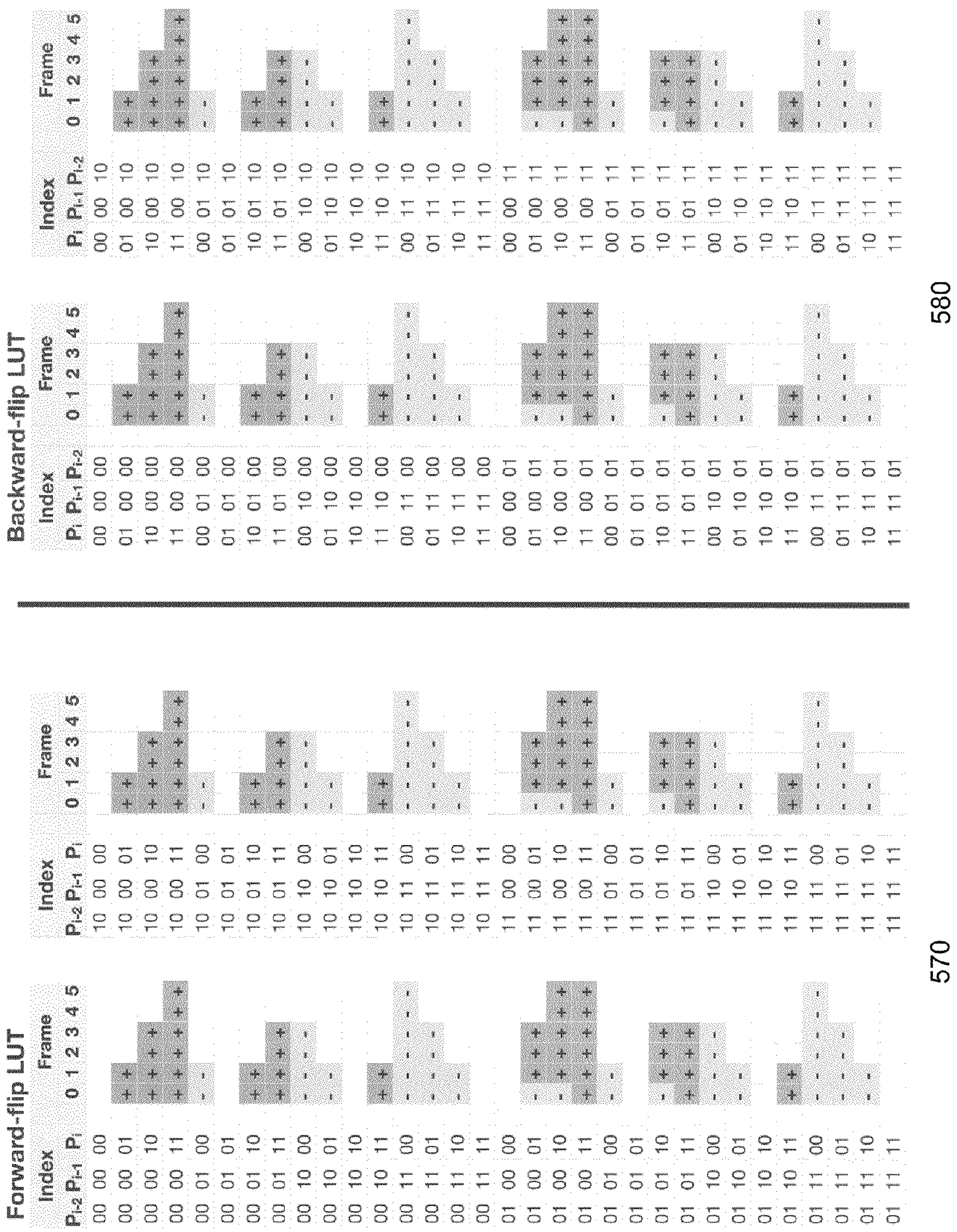
FIG. 5F illustrates an example of waveform lookup table that accounts for a previous color and a current color of a pixel in providing waveforms to drive the pixel to a next color according to some embodiments of the invention.

FIGS. 5D and 5E illustrate the relationship between a forward lookup table 552 and a reverse lookup table 554. The forward lookup table 552 in FIG. 5D comprises six frames used for 20 ms each to transition in forward direction from page n to page n+1. The reverse lookup table 554 in FIG. 5E comprises six frames to transition in reverse direction from page n+1 to page n. A comparison of frames 552*c* and 554*c* illustrates how the axes for the two look up tables 552, 554 are flipped and how the two look up tables 552, 554 include axially flipped values.

FIG. 5F illustrates an example of waveform lookup tables 570, 580 where H is equal to 3 and CBITS is equal to 2. FIG. 5F comprises a forward lookup table 570 and a reverse lookup table 580 that account for a previous color value and a current color value in determining a waveform to drive a pixel to a next color value. The previous color value $P_{i-2}$, current color value $P_{i-1}$ and next color value $P_i$ are each represented by 2 bits and together $P_{i-2}$, $P_{i-1}$ and $P_i$ form a six bit index into the waveform tables 570 and 580. Additionally, the waveform tables 570 and 580 support waveforms that are six frames long.

In one embodiment, an index in forward lookup table 570 points to the same waveform as an index that is sequentially flipped in the reverse lookup table 580. Accordingly, the index comprising $P_{i-2}$, $P_{i-1}$, and $P_i$ in this particular order in forward lookup table 570 points to the same waveform as index comprising $P_i$, $P_{i-1}$ and $P_{i-2}$ in reverse waveform lookup table 580. For example, to change a pixel color using a transition pixel in forward direction that has a previous color 01, a current color 01 and a next color 10, the waveform is indexed by 010110 and comprises a frame of negative charge followed by three frames of positive charge. The same waveform is also used to change a pixel color in reverse direction that has a previous color 10, current color 01, and next color 01.

System Overview

Figure 6:
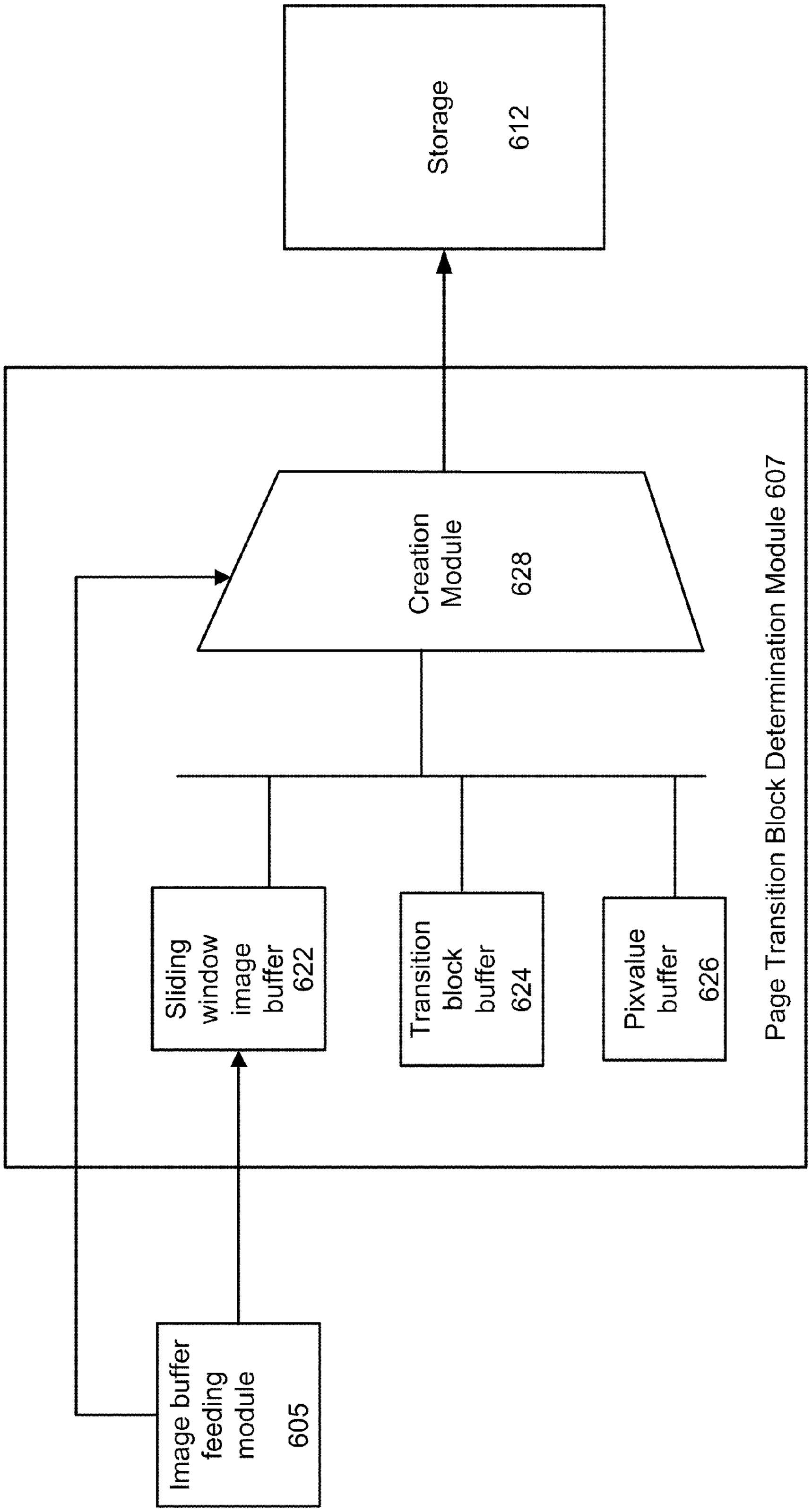
FIG. 6 illustrates a page transition file creation system according to some embodiments of the invention.

FIG. 6 illustrates a page transition file creation system 600 according to some embodiments of the invention. The page transition file creation system 600 comprises an image buffer feeding module 605, a page transition block determination module 607 and storage 612. The image buffer feeding module 605 communicatively couples to page transition block determination module 607 and the page transition block determination module 607 communicatively couples to storage 612.

The image buffer feeding module 605 extracts page images from a document and transmits the images to the sliding window image buffer 622 in page transition block determination module 607. Additionally, the image buffer feeding module 605 transmits to sliding window image buffer 622 and creation module 628 in page transition block determination module 607 values for H, CBITS, N and Num_Pix for the document.

The page transition block determination module 607 receives images from image buffer feeding module 605 and produces a page transition file 400 comprising header 402 and page transition blocks 404. The page transition block determination module 607 comprises sliding window image buffer 622, a transition block buffer 624, a pixvalue buffer 626 and creation module 628. These buffers 622, 624, 626 and creation module 628 are communicatively coupled to each other through a communication bus. The sliding window image buffer 622 is also communicatively coupled to image buffer feeding module 605. Creation module 628 is also communicatively coupled to image buffer feeding module 605 and storage 612.

The sliding window image buffer 622 is a computer readable storage medium like a hard drive, random access memory, compact drive, or a DVD. The sliding window image buffer 622 stores page images received from image buffer feeding module 605. In one embodiment, the sliding window image buffer 622 receives and stores pointers to page images instead of the page images themselves.

The transition block buffer 624 is a computer readable storage medium like a hard drive, random access memory, compact drive, or a DVD. The transition block buffer 624 stores a page transition block that is being created by creation module 628.

The pixvalue buffer 626 is a computer readable storage medium like a hard drive, random access memory, compact drive, or a flash memory. The pixvalue buffer 626 stores a page transition pixel that is being created by creation module 628.

Creation module 628 creates the page transition file 400 with header 402 and page transition blocks 404. Creation module 628 retrieves page images or pointers to page images from sliding window image buffer 622, creates in pixvalue buffer 626 page transition pixels representing transition of a pixel's color in H page images, and stores the completed transition pixel in transition block buffer 624. Creation module 628 repeats this process for every pixel in a page image to create page transition blocks 404 in transition block buffer 634. After completing a page transition block 404, creation module 628 stores the page transition block 404 in a page transition file 400 on storage 612. In one embodiment, creation module 628 creates a plurality of page transition files 400 from the received page images with each of the created page transition files representing page transitions in different directions or at different speeds. The functionality of creation module 628 is also explained in FIG. 8 and FIG. 9 below.

Storage 612 is a computer readable storage medium like a hard drive, random access memory, compact drive, or a flash memory. Storage 612 is used by creation module 628 in page transition block determination module 607, in one embodiment, to store page transition blocks 404 in a page transition file 400.

Figure 7:
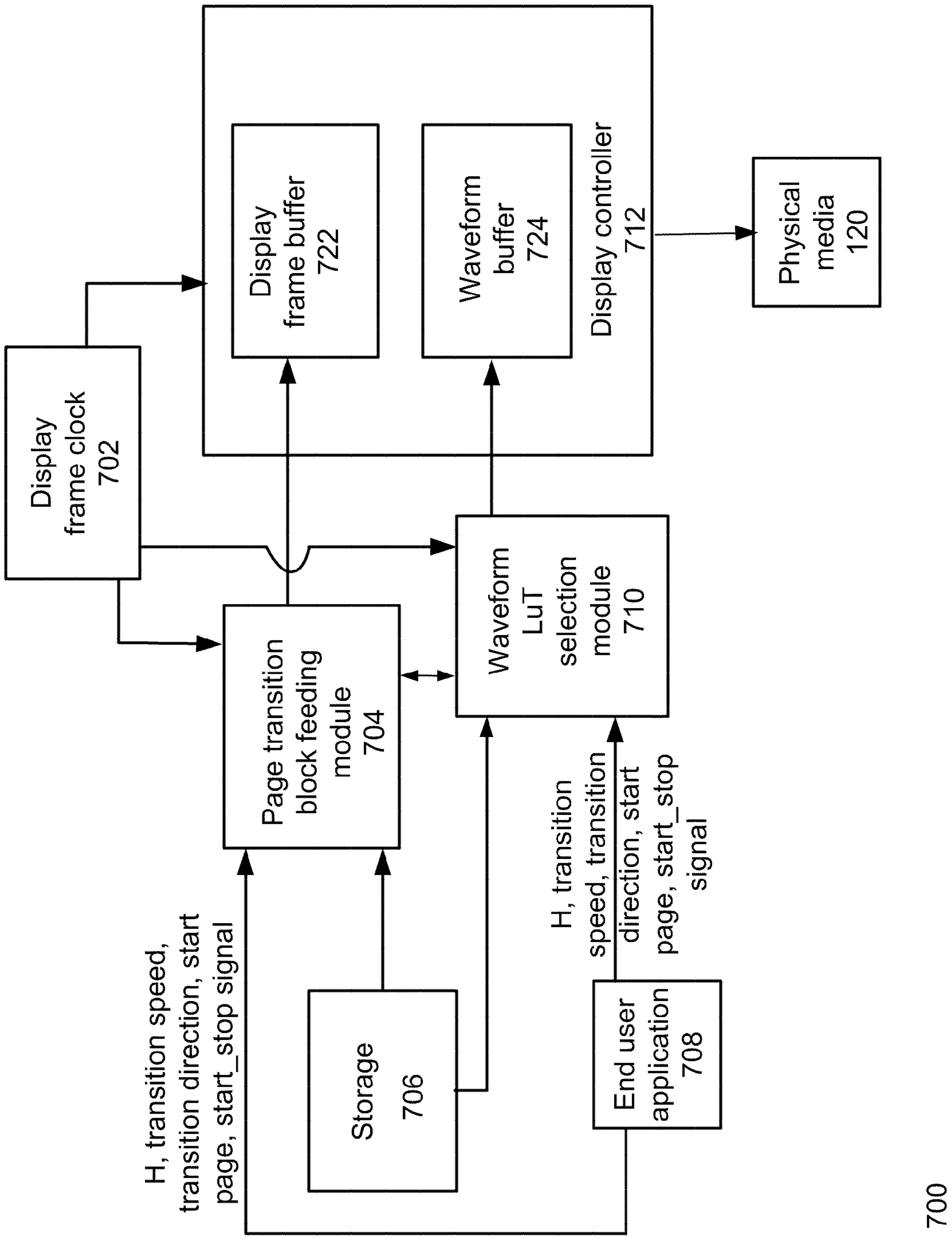
FIG. 7 illustrates a page transition display system and an end user application according to some embodiments of the invention.

FIG. 7 illustrates a page transition display system 700 and an end user application 708 according to some embodiments of the invention. The page transition display system 700 comprises a display frame clock 702, a page transition block feeding module 704, a storage 706, a waveform lookup table selection module 710, the display controller 712 and physical media 120. The display frame clock 702 is communicatively coupled to page transition block feeding module 704, waveform lookup table selection module 710 and display controller 712. The page transition block feeding module 704 is communicatively coupled to display frame clock 702, storage 706, end user application 708, waveform lookup table selection module 710 and display controller 712. Storage 706 is communicatively coupled to waveform lookup table selection module 710 and page transition block feeding module 704. The end user application 708 is communicatively coupled to waveform lookup table selection module 710 and page transition block feeding module 704. The waveform lookup table selection module 710 is communicatively coupled to storage 706, end user application 708, display frame clock 702, page transition block feeding module 704 and display controller 712. The display controller 712 is communicatively coupled to display frame clock 702, page transition block feeding module 704, waveform lookup table selection module 710 and physical media 120. Physical media 120 is communicatively coupled to display controller 712.

Storage 706 is a computer readable storage medium like a hard drive, random access memory, compact drive, flash memory, or a DVD. Storage 706 stores page transition file 400 and waveform lookup tables 500. In one embodiment, a user of page transition file display system 700 transfers to storage 706 page transition files 400 and waveform lookup tables 500 from a download location or a computer readable storage medium. In another embodiment, storage 706 is the same storage as storage 612 and the creation module 628 stores page transition files 400 in storage 706.

End user application 708 receives user input and determines the start page from which the page transition starts, page transition speed and page transition direction. In one embodiment, the user also specifies a value for H in the end user application or end user application 708 uses a default value for H. The end user application 708 transmits start page, page transition speed, page transition direction, page transition start_stop signal, and H to page transition block feeding module 704 and waveform lookup table selection module 710.

Display frame clock 702 transmits a clock signal that synchronizes page transition block feeding module 704, waveform lookup table selection module 710 and display controller 712. For example, the page transition block feeding module 704 is configured to transmit a page transition block 404 every n number of frames because the display controller 712 takes n number of frames to drive the pixel color from a previous value to desired value after receiving the desired value. Similarly, the waveform lookup table selection module 710 is configured to transmit a new waveform lookup table, if required, corresponding to the number of pages that have been shown at a given speed in a given direction, to coincide with the display of a new page transition block 404 after n number of frames. The page transition block feeding module 704 and waveform lookup selection module 710 use the clock signal from display frame clock 702 to determine the right time when a new page transition block 404 or waveform lookup table 500 should be transmitted.

Page transition block feeding module 704 determines and transmits the appropriate page transition block 404 to display controller 712. The page transition block feeding module 704 receives from end user application 708 a start page, the page transition speed selected by the end user through end user application 708, page transition direction, H, and page transition start_stop signal. The page transition start_stop signal informs the page transition block feeding module 704 to enter or exit the page transition mode and start page informs the page transition block feeding module 704 to start the page transition from page numbered start page. In one embodiment, the end-user application is responsible for insuring that the start page is currently being displayed. In another embodiment, the page transition block feeding module 704 transmits the start page to display frame buffer 722 of display controller 712 and the display controller 712 uses prior art methods to display that page.

In one embodiment, the end user application 708 transmits to page transition block feeding module 704 the page transition file 400 or an address of page transition file 400. The page transition block feeding module 704 then determines part of the above mentioned information from header 402 of page transition file 400.

In another embodiment, end user application 708 transmits a document identifier to page transition block feeding module 704 and page transition block feeding module 704 determines the page transition file 400 associated with the received document.

In one embodiment, the page transition block feeding module 704 determines the page transition file 400 corresponding to the received page transition speed, page transition direction or H.

In yet another embodiment, the page transition block feeding module 704 is preconfigured with or determines from a configuration file the H and CBITS supported by display controller 712. The page transition block feeding module 704 determines a corresponding page transition file 400 that supports the H and CBITS of display controller 712.

Regardless of how the page transition block feeding module 704 determines the appropriate page transition file 400, the page transition block feeding module 704 determines the appropriate page transition block 400 using start page and one or more from the group of page transition speed, page transition direction and H. The page transition block feeding module 704 transmits the determined page transition block 404 to display controller 712.

In one embodiment, page transition block feeding module 704 also transmits an index length for page transition block 404 to display controller 712. Index length equals H times CBITS and informs the display controller 712 about the length of transition pixel in page transition blocks 404. In another embodiment, display controller 712 is preconfigured with an index length and the page transition block feeding module 712 transmits a page transition block 404 that corresponds to the index length supported by display controller 712.

The waveform lookup table selection module 710 determines and transmits to waveform buffer 724 a waveform lookup table 500 corresponding to one or more of speed, direction, values of H and CBITS, and number of page transition blocks that have been seen since page flipping was started for the current speed and direction. The waveform lookup table selection module 710 receives from end user application 708 start page, page transition speed, page transition direction, H, and page transition start_stop signal. In one embodiment, the end user application 708 transmits to waveform lookup table selection module 710 page transition file 400 or an address of page transition file 400. The waveform lookup table selection module 710 then determines part of the above mentioned information from header 402 of page transition file 400.

In another embodiment, the page transition file 400 is determined by page transition block determination module 704 and page transition block determination module 704 transmits to waveform lookup table selection module 710 the page transition file 400 or an address of page transition file 400.

The waveform lookup table selection module 710 uses one or more from the group of page transition speed, page transition direction and H to determine the appropriate waveform lookup table 500 that corresponds to the transmitted page transition block 404. For example, the waveform lookup table selection module 710 selects one waveform lookup table 500 for displaying five page transitions in a second and a different waveform lookup table 500 for displaying ten page transitions in a second.

When the page transition start stop signal is turned on, the waveform lookup table selection module 710 selects and transmits a pre-defined waveform lookup table 500 to waveform buffer 724. This waveform lookup table 500 is selected based on the received page transition speed and page transition direction. Because this is the first page transition performed at the page transition speed, the selected waveform lookup table will account for the current and next color for a pixel and ignore any prior history encoded in a transition pixel. As history is accumulated, waveform lookup table selection module 710 determines and transmits different waveform tables that account for the additional history. Eventually, waveform lookup table selection module 710 transmits the waveform lookup table that accounts for as much history as encoded in the page transition block 404.

Display controller 712 uses the received page transition blocks, waveform lookup table, and index length to lookup waveforms, apply them to physical media 120, and drive the pixel colors on physical media 120 to desired colors. In one embodiment, the display controller 712 reads the transition pixel from a page transition block 404 and uses the value of transition pixel as an index into the waveform lookup table 500 to determine the appropriate waveform. The display controller 712 then applies the determined waveform to physical media 120 and drives the pixel color to desired color.

In one embodiment, display controller 712 is pre-configured with an index length and display controller 712 does not receive an index length. The page transition block determination module 704 in this embodiment determines the index length supported by display controller 712 and transmits page transition blocks 404 supporting that index length.

Display controller 712 comprises display frame buffer 722 and waveform buffer 724. In one embodiment, the display frame buffer 722 and waveform buffer 724 are portions of random access memory in display controller 712. Display frame buffer 722 is communicatively coupled to page transition block feeding module 704 and receives page transition blocks 400 from page transition block feeding module 704.

Waveform buffer 724 is communicatively coupled to waveform lookup table selection module 710 and receives a waveform lookup table 500 corresponding to the page transition block 400 received in display frame buffer 722.

Physical media 120 is the microcapsule layer 120 and has been explained above in reference to FIG. 1.

Method Overview

Figure 8:
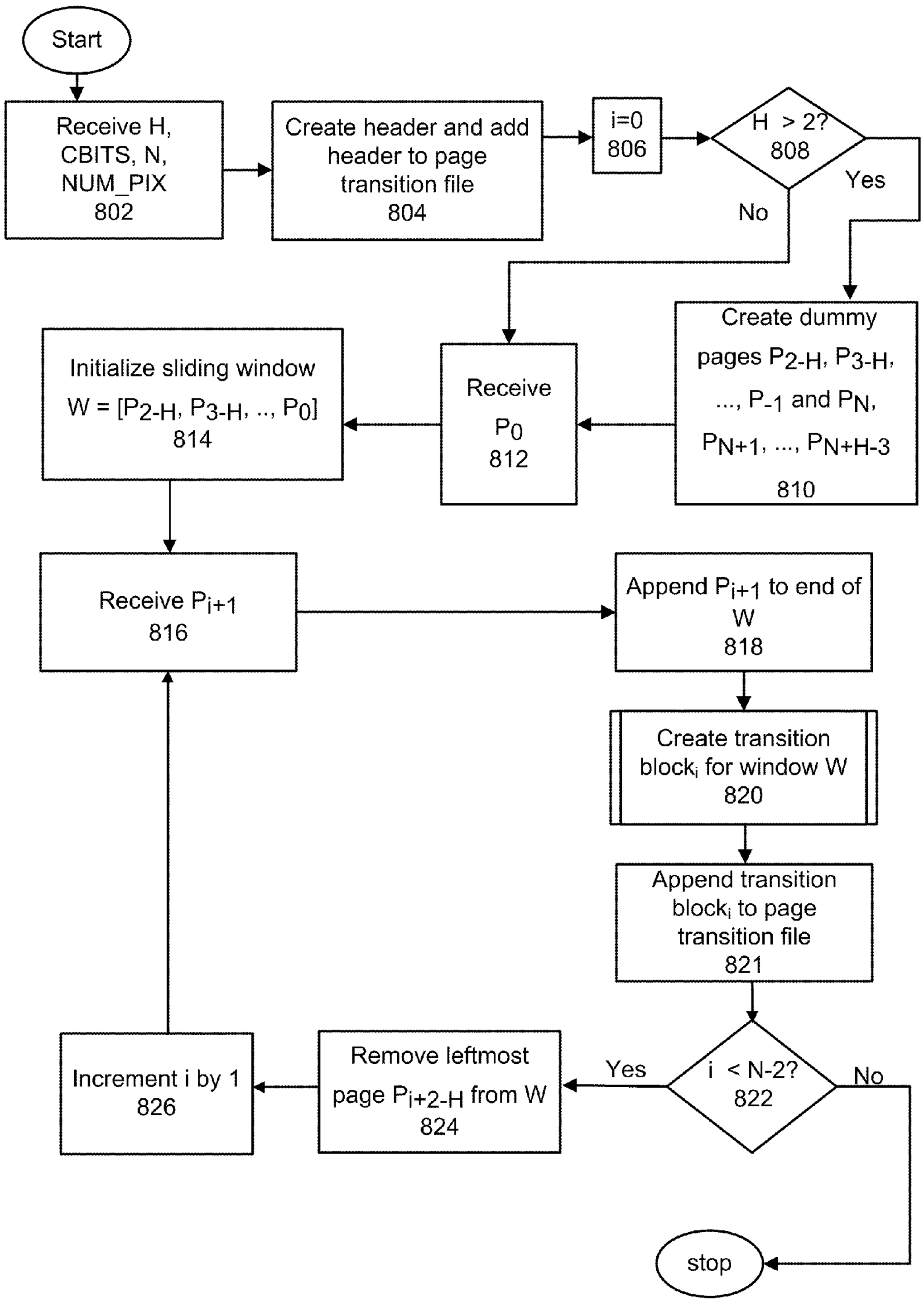
FIG. 8 illustrates a method for creating page transition file for a document according to some embodiments of the invention.

FIG. 8 illustrates a method for creating page transition file 400 for a document according to some embodiments. Creation module 628 in page transition block determination module 607 receives 802 H, CBITS, N and Num_Pix, creates 804 a header 402 populated with the received information, and adds the header 402 to the page transition file 400. In one embodiment, creation module 628 also receives one or more of page transition speed and page transition direction to be supported by the page transition file 400 from the image buffer feeding module 605. In this embodiment, creation module 628 also adds the received page transition speed and/or page transition direction to header 402.

Next, creation module 628 initializes 806 a counter variable i to zero and determines 808 if H is greater than 2. If yes, creation module 628 creates 810 dummy pages $P_{2-H}$ to $P_{-1}$ and $P_N$ to $P_{N+H-3}$ wherein $P_n$ represents page n in the document and the first page in the document is page 0. Otherwise, creation module 628 skips step 810 and receives 812 the first page $P_0$ of the document from image buffer feeding module 605.

Creation module 628 then initializes 814 sliding window image buffer 622 and creates a sliding window W with consecutive pages from $P_{2-H}$ to $P_0$. In one embodiment, the sliding window W includes data representing pages $P_{2-H}$ to $P_0$. In another embodiment, the sliding window W includes pointers to the data representing pages $P_{2-H}$ to $P_0$. When the sliding window W includes pointers, creation module 628 uses these pointers to access the data representing pages $P_{2-H}$ to $P_0$.

After initialization of sliding window W, creation module 628 receives 816 page $P_{i+1}$ and appends 818 the received page to the end of the sliding window W. Again, creation module 628 can also append the sliding window W with received pointer to page $P_{i+1}$ if creation module 628 receives pointer to the data representing the page instead of the page itself. Next, creation module 628 creates 820 a page transition block$_i$ with the current pages in sliding window W. The method for creating a page transition block$_i$ is described below with reference to FIG. 9.

Creation module 628 then appends 821 the created page transition block$_i$ to page transition file 400 and determines 822 if i is smaller than N−2. If not, the transition file 400 has been created, the file 400 comprises header 402 and the desired page transition blocks 404, and the method of file creation ends.

If i is smaller than N−2, the creation module 628 continues creating and appending additional page transition blocks 404 to page transition file 400. Creation module 628 removes 824 the leftmost page $P_{i+2-H}$ from sliding window W, increments 826 i by one, receives 816 page $P_{i+1}$, and appends 818 page $P_{i+1}$ to the end of sliding window W. The creation module 628 then repeats steps 820-826 and steps 816-818 until i becomes greater than N−2. Once i becomes greater than N−2, the page transition file 400 is complete and the creation method ends.

Figure 9:
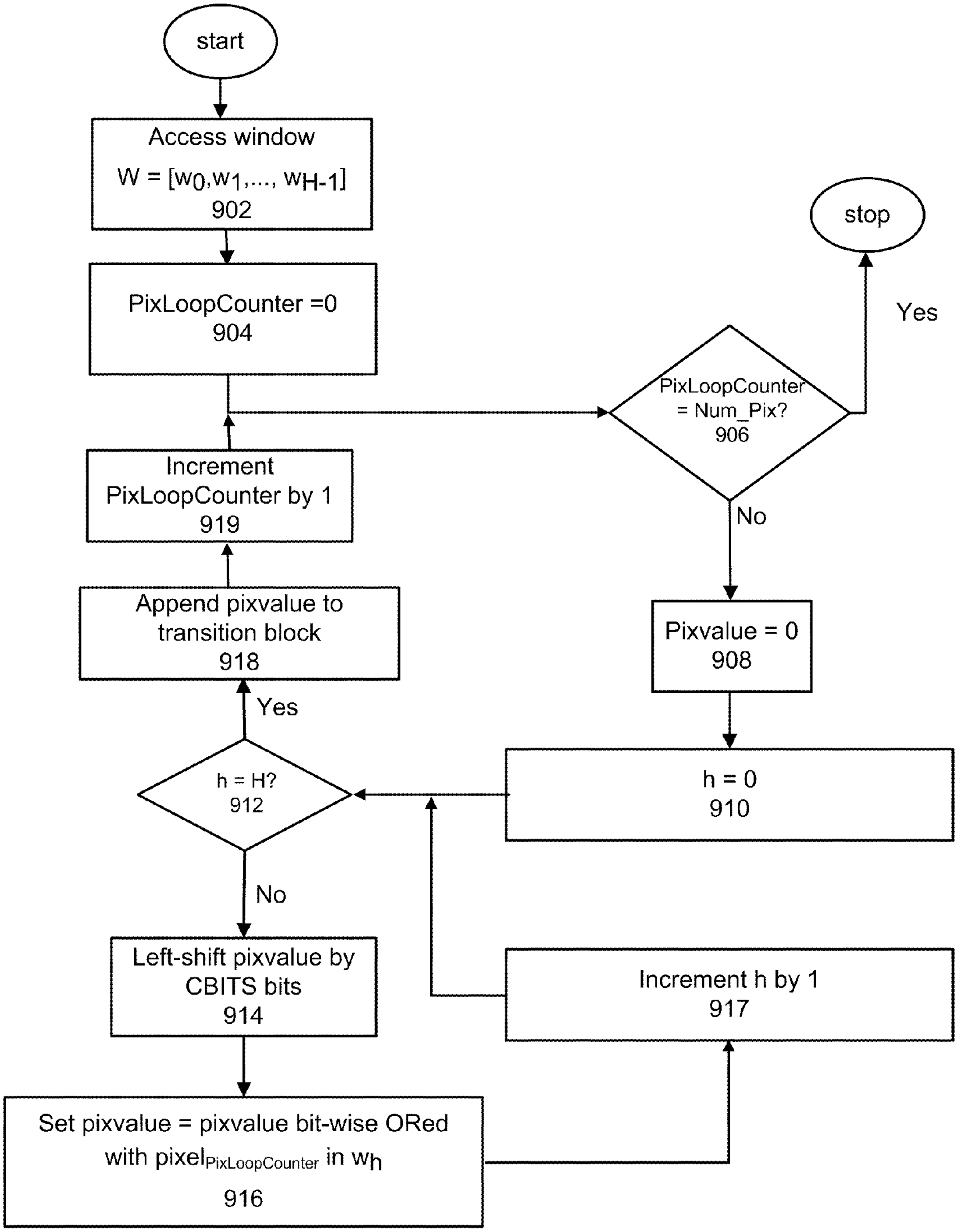
FIG. 9 illustrates a method for creating a page transition block according to some embodiments of the invention.

FIG. 9 illustrates a method for creating page transition blocks 404 according to some embodiments of the invention. The creation module 628 accesses 902 sliding window W after it is populated in step 818 of FIG. 8. The contents of the sliding window W in this figure are represented as $w_h$ for better illustration of the method of FIG. 9. Content $w_0$ corresponds to $P_{i+2-H}$ in FIG. 8, $w_1$ corresponds to $P_{i+3-H}$, and $w_{H-1}$ corresponds to $P_{i+1}$.

The creation module 628 next initializes 904 variable PixLoopCounter to zero and then determines 906 if PixLoopCounter is equal to Num_Pix. This check terminates a loop for creating transition pixels corresponding to pixels in $w_0$ to $w_{H-1}$ pages when PixLoopCounter is equal to Num_Pix. If PixLoopCounter is equal to Num_Pix, the method for creating page transition block$_i$ is complete.

If not, creation module 628 initializes 908 pixvalue buffer 626 to zero and sets 910 variable h to zero. Creation module 628 next determines if h is equal to H. This check terminates a loop for updating a transition pixel to incorporate color values of corresponding pixel in $w_0$ to $w_{H-1}$ pages. If h is not equal to H, creation module 628 performs 914 a left logical shift on pixvalue buffer 626 and left-shifts pixvalue by CBITS bits. Next, creation module 628 performs a bitwise OR on pixvalue buffer 626 and pixel$_{PixLoopCounter}$ (pixel at PixLoopCounter position) in $w_h$. Creation module 628 then sets 916 pixvalue buffer 626 to the result of the bitwise OR function. After updating pixvalue buffer 626, Creation module 628 increments 917 h by 1 and determines 912 if h=H. If not, creation module 628 performs steps 914, 916 and 917 until h=H.

If h=H, the pixvalue has been updated to transition pixel$_{PixLoopCounter}$ and the creation module 628 appends 918 contents of pixvalue buffer 626 to the transition block 404. Creation module 628 then increments PixLoopCounter by 1 and repeats steps 906 to 919 as described above. Once PixLoopCounter equals Num_Pix, the transition block 404 is complete and creation module 628 moves to step 821 in FIG. 8 as described above.

Figure 10:
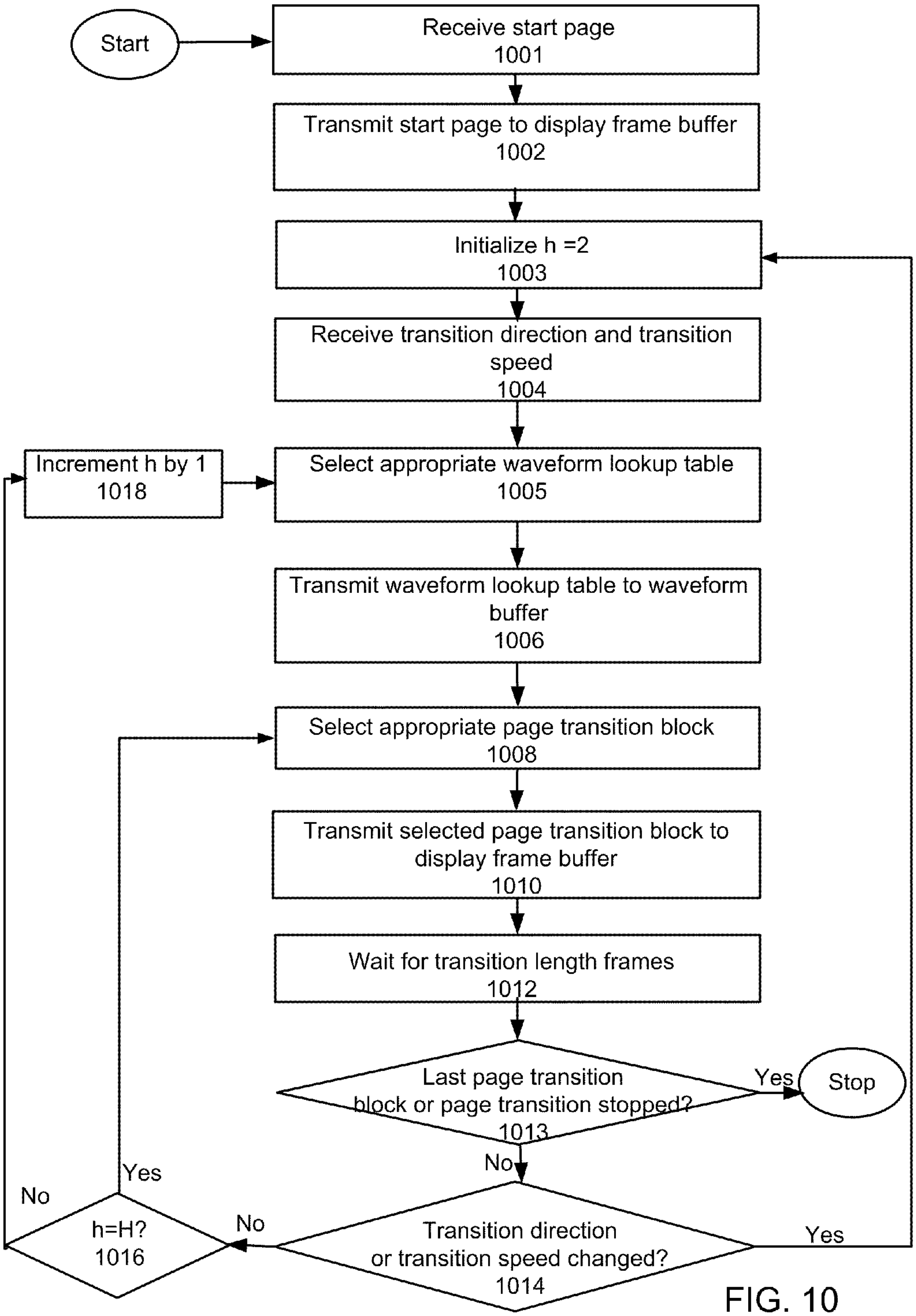
FIG. 10 illustrates a method for updating display controller as the user selects a start page, transition direction and transition speed on an end user application according to some embodiments of the invention.

FIG. 10 illustrates a method for updating display controller 712 as the user selects page transitions on an end user application according to some embodiments of the invention. The page transition block feeding module 704 receives 1001 the start page, transmits 1002 the start page to display frame buffer 722 of display controller 712, and the display controller 712 uses prior art methods to display that page.

The waveform lookup table selection module 710 next initializes h 1003 to two and starts a counter to track the available pixel history so that the waveform lookup table can provide a waveform lookup table 500 that supports the amount of encoded pixel history. The waveform lookup table selection module 710 and page transition block feeding module 704 then receive 1004 one or more of transition direction, transition speed, and H from end user application 708.

Next, the waveform lookup table selection module 710 selects 1005 an appropriate waveform lookup table based on one or more of h, transition speed and transition direction. The selection criteria for waveform lookup table have been described above. The waveform lookup table selection module 710 then transmits 1006 the selected waveform lookup table to waveform buffer 724.

The page transition block feeding module 704 selects 1008 an appropriate page transition block 404 and transmits 1010 the page transition block 404 to display frame buffer 722. The selected page transition block 404 represents a transition from start page to the following page.

Next, the waveform lookup table selection module 710 and page transition block feeding module 704 wait 1012 transition length frames and then determine 1013 if the page transition should stop because the last page transition block has been transmitted to display frame buffer 722. In one embodiment, the page transition block determination module 704 informs the waveform lookup table selection module 710 about the last page transition block after transmitting the page transition block to display frame buffer 722. The end user application 708 can also inform the waveform lookup table selection module 710 and page transition block feeding module 704 that the user has selected to stop the page transition.

If the page transition is stopped, the method to display page transition is complete. If not, the waveform lookup table selection module 710 and page transition block feeding module 704 determine 1014 if the user has selected a different transition speed or transition direction. If the user has selected a different transition speed or transition direction, steps 1003 to 1014 are repeated again. If not, the waveform lookup table selection module 710 determines 1016 if h=H. If yes, steps 1008-1016 are repeated again. Otherwise, the waveform lookup table selection module 710 increments 1018 h by 1 to account for additional available pixel history.

Next, steps 1005-1018 are repeated. The waveform lookup table selection module 710 selects 1005 an appropriate waveform lookup table and transmits 1006 the waveform lookup table to waveform buffer 724. In one embodiment, the waveform lookup table selection module 710 determines that the selected waveform lookup table is the same as the previously transmitted waveform lookup table and the waveform lookup table skips step 1006.

The page transition block feeding module 704 selects 1008 and transmits 1010 the next page transition block that represents a transition from previously displayed page to the next page.

The page transition block feeding module 704 and waveform lookup table selection module 710 keep repeating steps 1005 to 1018, steps 1003 to 1018, or steps 1008 to 1018 until the last page transition block is transmitted or the user selects to stop the page transition.

Figure 11:
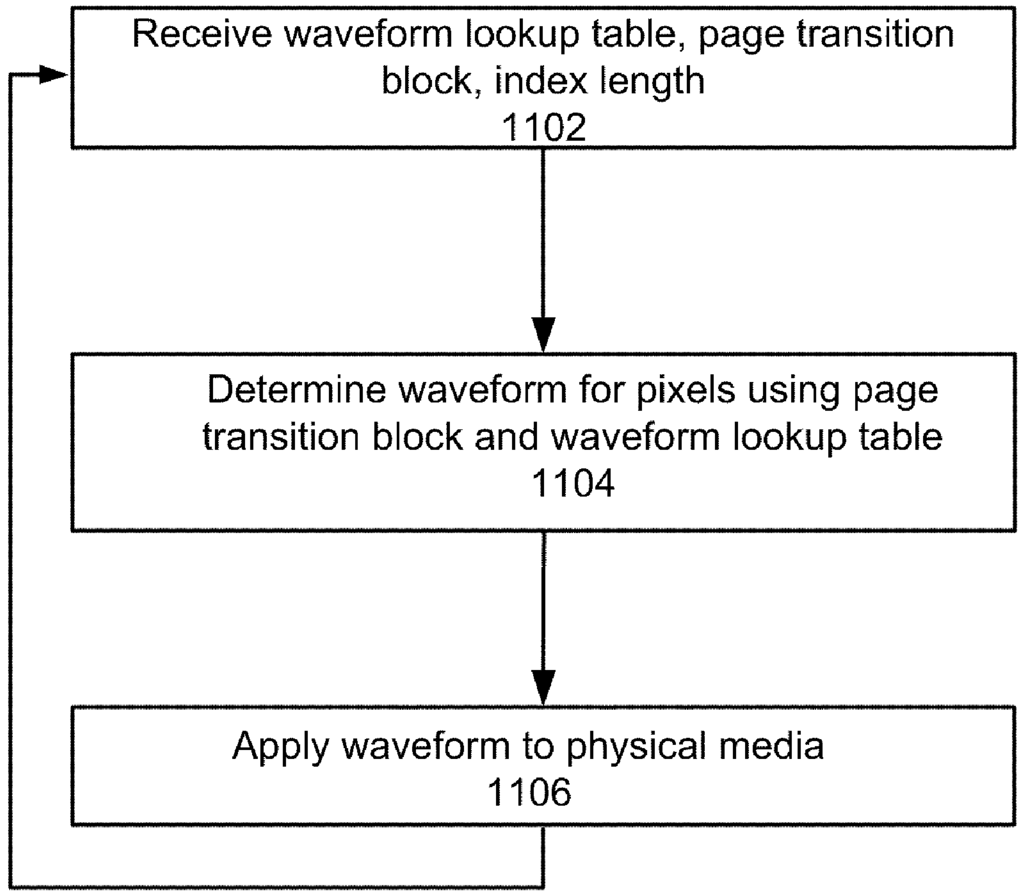
FIG. 11 illustrates a method for updating physical media to display page transition according to some embodiments of the invention.

FIG. 11 illustrates a method for updating physical media 120 to display page transition. The display controller 712 receives 1102 the appropriate waveform lookup table 500 and page transition block 404 as described in FIG. 10. The display controller 712 also receives 1102 the index length from page transition block determination module 704.

In one embodiment, the display controller 712 does not receive the index length and the display controller 712 is pre-configured to expect waveform lookup tables with a particular index length. In another embodiment, the display controller 712 receives the index length as part of the waveform lookup table 500 and the display controller 712 reads the waveform lookup table to determine the index length for the waveform lookup table. For example, a waveform lookup table 500 is transmitted with a header comprising the index length used in the waveform lookup table 500.

The display controller 712 reads the received page transition block and reads the transition pixels. The display controller 712 then uses the value in transition pixels as an index to corresponding waveforms in the waveform lookup table, and determines 1104 a waveform for each pixel on the physical medial. The display controller 712 then applies 1106 the determined waveform to physical media 120 for transition length frames. The display controller 712 then repeats steps 1102-1106 for the next page transition block until the physical media 120 has displayed all the page transitions. After page transitions have been displayed, the display controller 712 may re-display the last page shown using waveforms that remove ghosting artifacts, according to prior art methods.

The invention claimed is:

1. A system for creating a page transition file for an electronic paper display from a document having a plurality of pages, the system comprising:

an image buffer feeding module for receiving the document and transmitting the plurality of pages of the document;

a sliding window image buffer, communicatively coupled to the image buffer feeding module, for receiving the plurality of pages of the document from the image buffer feeding module wherein the received plurality of pages comprise data representing the plurality of pages or pointers to the data, the sliding window image buffer for storing the received plurality of pages;

a creation module, communicatively coupled to the sliding window image buffer, for creating the page transition file from the plurality of pages stored in the sliding window image buffer, the page transition file comprising a header representing data associated with the document and a plurality of page transition blocks, each page transition block representing a transition through at least two pages of the document and having a plurality of page transition pixels, wherein each of the plurality of page transition pixels packs varying colors of an image pixel on the at least two pages of the document into a pixel value; and a storage for storing the page transition file created by the creation module.

2. The system of claim 1 wherein one of the plurality of page transition pixels includes an index to a waveform in a waveform lookup table, the waveform when applied to a physical media transitions a color of a display pixel on the physical media from a previous color indicated by the one of the plurality of page transition pixels to a next color also indicated by the one of the plurality of page transition pixels.

3. The system of claim 1 wherein one of the plurality of transition pixels comprises a plurality of groups of bits, one of the plurality of group of bits representing a varying color of a pixel in at least two pages of the document.

4. A page transition display system for displaying page transitions on an electronic paper display, the system comprising:

a storage for storing a page transition file comprising a header representing data associated with a document and a plurality of page transition blocks, each page transition block representing a transition through at least two pages of the document and having a plurality of page transition pixels, wherein each of the plurality of page transition pixels packs varying colors of an image pixel on the at least two pages of the document into a pixel value, and for storing a waveform lookup table having waveforms for driving a pixel on the electronic paper display from one color to another;

a page transition block feeding module, communicatively coupled to the storage, for determining and retrieving a current page transition block from the plurality of page transition blocks and transmitting the current page transition block to the display controller; and a display controller, communicatively coupled to the page transition block feeding module, for determining a desired waveform from a current waveform lookup table based on a current transition pixel from the current page transition block and for applying the desired waveform to a physical media of the electronic paper display.

5. The system of claim 4 comprising:

a waveform lookup table selection module, communicatively coupled to the storage, for retrieving the current waveform lookup table for the current page transition block, and transmitting the current waveform lookup table to the display controller.

6. The system of claim 4 wherein:

the storage includes a plurality of waveform lookup tables having waveforms for displaying transition of document pages in a transition direction, the system comprising:

a waveform lookup table selection module configured to receive a desired direction of transition of document pages and select as the current waveform lookup table one of the plurality of waveform lookup tables having waveforms for displaying transition of document pages in a direction matching the desired direction.

7. The system of claim 4 wherein:

the storage includes a plurality of waveform lookup tables having waveforms for displaying transition of document pages at a transition speed, the system comprising:

a waveform lookup table selection module configured to receive a desired speed of transition of document pages and select as the current waveform lookup table one of the plurality of waveform lookup tables having waveforms for displaying transition of document pages at a speed matching the desired speed.

8. The system of claim 4 wherein:

the storage includes a plurality of waveforms lookup tables having waveforms indexed by a transition pixel having a transition pixel size, the system comprising:

a waveform lookup table selection module configured to receive a desired transition pixel size of one of the plurality of page transition pixels and select as a current waveform lookup table one of the plurality of waveform lookup tables having waveforms indexed by an index of transition pixel size matching the desired transition pixel size.

9. The system of claim 4 wherein:

the storage includes a plurality of waveform lookup tables having waveforms for page transition blocks representing a number of document pages, the system comprises:

a waveform lookup table selection module configured to receive a desired number of document pages represented by the current page transition block and select as a current waveform lookup table one of the plurality of waveform lookup tables having waveforms for transition block that represents the desired number of document pages.

10. The system of claim 4 wherein:

the storage includes a plurality of waveform lookup tables having waveforms for page transition blocks representing a number of document pages, the system comprises:

a waveform lookup table selection module configured to receive a current number of consecutive pages that have been displayed and select as a current waveform lookup table one of the plurality of waveform lookup tables based upon the current number of consecutive pages that have been displayed.

11. A method for creating a page transition file for an electronic paper display from a document having a plurality of pages, the method comprising:

receiving, by a sliding window image buffer from an image buffer feeding module, the plurality of pages in the document wherein the received plurality of pages comprise data representing the plurality of pages or pointers to the data;

storing, by the sliding window image buffer, the received plurality of pages;

creating, by a creation module, the page transition file from the stored plurality of pages, the page transition file comprising a header representing data associated with the document and a plurality of page transition blocks, each page transition block representing a transition through at least two pages of the document and having a plurality of page transition pixels, wherein each of the plurality of page transition pixels packs varying colors of an image pixel on the at least two pages of the document into a pixel value; and storing, by the creation module on a storage, the page transition file.

12. The method of claim 11 wherein one of the plurality of page transition pixels includes an index to a waveform in a waveform lookup table, the waveform when applied to a physical media transitions a color of a display pixel on the physical media from a previous color indicated by the one of the plurality of page transition pixels to a next color also indicated by the one of the plurality of page transition pixels.

13. The method of claim 11 wherein the one of the plurality of page transition pixels comprises a plurality of groups of bits, one of the plurality of group of bits representing a varying color of a pixel between at least two pages of the document.

14. A method for displaying page transitions on an electronic paper display, the method comprising:

storing, in a storage, a page transition file comprising a header representing data associated with a document and a plurality of page transition blocks, each page transition blocks representing a transition through at least two pages of the document and having a plurality of page transition pixels, wherein each of the plurality of page transition pixels packs varying colors of an image pixel on the at least two pages of the document into a pixel value, and one or more waveform lookup tables comprising waveforms for driving a pixel on the electronic paper display from one color to another;

determining, by a page transition block determination module, a current page transition block from the plurality of page transition blocks in the page transition file and transmitting the current page transition block to a display controller; and determining, by the display controller, a desired waveform from a current waveform lookup table based on a current transition pixel from the current page transition block and applying the desired waveform to a physical media of the electronic paper display.

15. The method of claim 14 comprising:

determining, by a waveform lookup table selection module, the current waveform lookup table for the current page transition block and transmitting the current waveform lookup table to the display controller.

16. The method of claim 15 wherein determining the current waveform lookup table comprises receiving a desired direction of transition of document pages and selecting the current waveform lookup table from a plurality of waveform lookup tables based upon the desired direction of transition of document pages.

17. The method of claim 15 wherein determining the current waveform lookup table comprises receiving a desired speed of transition of document pages and selecting the current waveform lookup table from a plurality of waveform lookup tables based upon the desired speed of transition of document pages.

18. The method of claim 15 wherein determining the current waveform lookup table comprises receiving a transition pixel size of one of the plurality of page transition pixels, and selecting the current waveform lookup table from a plurality of waveform lookup tables based upon the transition pixel size of one of the plurality of page transition pixels.

19. The method of claim 15 wherein determining the current waveform lookup table comprises receiving a number of document pages represented by one of the plurality of page transition blocks, and selecting the current waveform lookup table from a plurality of waveform lookup tables based upon the number of document pages represented by one of the plurality of page transition blocks.

20. The method of claim 15 wherein determining the current waveform lookup table comprises:

receiving a current number of consecutive pages that have been displayed; and selecting the current waveform lookup table from a plurality of waveform lookup tables based upon the current number of consecutive pages that have been displayed.

* * * * *